(12) United States Patent
Cheng

(10) Patent No.: US 7,075,267 B1
(45) Date of Patent: Jul. 11, 2006

(54) SPACE VECTOR-BASED CURRENT CONTROLLED PWM INVERTER FOR MOTOR DRIVES

(75) Inventor: Kuang-Yao Cheng, Taipei (TW)

(73) Assignee: Prolific Technology Inc., Taipei (TW)

(*) Notice: Subject to any disclaimer, the term of this patent is extended or adjusted under 35 U.S.C. 154(b) by 8 days.

(21) Appl. No.: 11/027,330

(22) Filed: Dec. 29, 2004

(51) Int. Cl.
| H02P 23/00 | (2006.01) |
| H02P 25/00 | (2006.01) |
| H02P 27/00 | (2006.01) |
| H02P 27/04 | (2006.01) |

(52) U.S. Cl. .................. 318/807; 318/432; 318/434; 318/727; 318/812

(58) Field of Classification Search ............... None
See application file for complete search history.

(56) References Cited

U.S. PATENT DOCUMENTS

| 6,448,738 B1* | 9/2002 | Burton et al. ............... 318/807 |
| 6,590,361 B1* | 7/2003 | Walters et al. .............. 318/727 |
| 6,774,592 B1* | 8/2004 | Walters et al. .............. 318/254 |
| 6,784,634 B1* | 8/2004 | Sweo ........................ 318/727 |
| 6,850,033 B1* | 2/2005 | Gallegos-Lopez et al. .. 318/807 |
| 6,984,953 B1* | 1/2006 | Quirion et al. ............. 318/599 |
| 2004/0021447 A1* | 2/2004 | Kalman et al. ............... 322/24 |

* cited by examiner

*Primary Examiner*—Rina Duda
*Assistant Examiner*—Erick Glass

(57) ABSTRACT

A motor driver has a plurality of output circuits each having an upper side switch and a lower side switch connected in series for supplying a current to a motor. The motor driver includes a current detection resistor connected in series with the plurality of output circuits in common for detecting a current supplied to the plurality of output circuits, a position detection circuit for outputting a position signal corresponding to a position of a rotor of the motor, a current command generation circuit for generating a target current command signal based on the position signal and a predetermined phase angle in which a phase angle of the target current command signal is determined by the predetermined phase angle, and a space vector modulation based logic control circuit for commanding a plurality of output circuits that are set in a plurality of switches states for control of an electric motor.

11 Claims, 36 Drawing Sheets

| Hu Hv | 100 M1 M2 | 101 M1 M2 | 110 M1 M2 | 111 M1 M2 | 000 M1 M2 | 001 M1 M2 | 010 M1 M2 | 011 M1 M2 |
|---|---|---|---|---|---|---|---|---|
| (I) 100 | 010 V3 | 010 V3 | 010 V3 | 010 V3 | 000 V1 | xxx V0 | 101 V2 | xxx V0 |
| (II) 110 | 000 V1 | 000 V1 | 000 V1 | 000 V1 | 010 V3 | xxx V0 | 101 V2 | xxx V0 |
| (III) 010 | 100 V5 | 100 V5 | 100 V5 | 100 V5 | 010 V3 | xxx V0 | 001 V4 | xxx V0 |
| (IV) 011 | 010 V3 | 010 V3 | 010 V3 | 010 V3 | 100 V5 | xxx V0 | 001 V4 | xxx V0 |
| (V) 001 | 000 V1 | 000 V1 | 000 V1 | 000 V1 | 000 V1 | xxx V0 | 011 V6 | xxx V0 |
| (VI) 101 | 100 V5 | 100 V5 | 100 V5 | 100 V5 | xxx V0 | xxx V0 | 011 V6 | xxx V0 |
| 000 | xxx V0 | xxx V0 | xxx V0 | xxx V0 | xxx V0 | xxx V0 | xxx V0 | xxx V0 |
| 111 | xxx V0 | xxx V0 | xxx V0 | xxx V0 | xxx V0 | xxx V0 | xxx V0 | xxx V0 |

FIG. 26

| SS DS CS \ Hu Hv Hw HK | 100 M1 M2 M3 V | 101 M1 M2 M3 V | 110 M1 M2 M3 V | 111 M1 M2 M3 V | 000 M1 M2 M3 V | 001 M1 M2 M3 V | 010 M1 M2 M3 V | 011 M1 M2 M3 V |
|---|---|---|---|---|---|---|---|---|
| (I) 1001 | 011 V6 | 011 V6 | 011 V6 | 011 V6 | 101 V2 | xxx V7 | 000 V1 | xxx V7 |
| 1000 | 010 V3 | 010 V3 | 010 V3 | 010 V3 | 000 V1 | xxx V0 | 101 V2 | xxx V0 |
| 1100 | 000 V1 | 000 V1 | 000 V1 | 000 V1 | 010 V3 | xxx V0 | 101 V2 | xxx V0 |
| (II) 1101 | 001 V4 | 001 V4 | 001 V4 | 001 V4 | 101 V2 | xxx V7 | 010 V3 | xxx V7 |
| 0101 | 101 V2 | 101 V2 | 101 V2 | 101 V2 | 001 V4 | xxx V7 | 010 V3 | xxx V7 |
| (III) 0100 | 100 V5 | 100 V5 | 100 V5 | 100 V5 | 010 V3 | xxx V0 | 001 V4 | xxx V0 |
| 0110 | 010 V3 | 010 V3 | 010 V3 | 010 V3 | 100 V5 | xxx V0 | 001 V4 | xxx V0 |
| (IV) 0111 | 011 V6 | 011 V6 | 011 V6 | 011 V6 | 001 V4 | xxx V7 | 100 V5 | xxx V7 |
| 0011 | 001 V4 | 001 V4 | 001 V4 | 001 V4 | 011 V6 | xxx V7 | 100 V5 | xxx V7 |
| (V) 0010 | 000 V1 | 000 V1 | 000 V1 | 000 V1 | 100 V5 | xxx V0 | 011 V6 | xxx V0 |
| 1010 | 100 V5 | 100 V5 | 100 V5 | 100 V5 | 000 V1 | xxx V0 | 011 V6 | xxx V0 |
| (VI) 1011 | 101 V2 | 101 V2 | 101 V2 | 101 V2 | 011 V6 | xxx V7 | 000 V1 | xxx V7 |
| 000x | xxx V0 | xxx V0 | xxx V0 | xxx V0 | xxx V0 | xxx V0 | xxx V0 | xxx V0 |
| 111x | xxx V0 | xxx V0 | xxx V0 | xxx V0 | xxx V0 | xxx V0 | xxx V0 | xxx V0 |

FIG. 34

SPACE VECTOR-BASED CURRENT CONTROLLED PWM INVERTER FOR MOTOR DRIVES

BACKGROUND OF THE PRESENT INVENTION

1. Field of Invention

The present invention relates to a motor drive technology, and more particularly to a motor drive technology of a space vector-based current controlled PWM system.

2. Description of Related Arts

Permanent magnet AC motors (PMACMs) have been widely adopted for high-performance servo applications, because of their desirable features: high efficiency, hight torque to inertia ratio, lower maintenance cost, and compact structure when compared to induction and brush DC motors. The use of permanent magnets to generate substantial air gap magnetic flux without excitation makes it possible to design PMACMs with unsurpassed efficiency characteristics. Such efficiency advantages are becoming increasingly valuable in many applications of the world. Since all of the PMACMs are synchronous machines, an average torque can be produced only when the excitation is precisely synchronized with the rotor speed and instantaneous position. The most direct and powerful means of ensuring the synchronization is to continuously measure the rotor's absolute angular position with mounted position sensors, such as Hall-effect sensors, so that the excitation can be switched among the PMACM phases in exact synchronism.

One simple method for achieving the synchronization is using a six-step voltage inverter. The basic operation of the six-step voltage inverter can be understood by considering the inverter as six ideal switches. The line-to-line voltages and line-to-neutral voltages then have the waveform shown in FIG. 1. The line-to-line voltage contains an rms fundamental component of $$V_{ll(rms\;fund)} = \frac{\sqrt{6}}{\pi} V_{cc} \quad (1)$$

Please refer to J. Holtz, "Pulsewidth modulation—A survey," *IEEE Trans. Ind. Electron.*, vol. 39, no. 5, pp. 410–420, December 1992. The pulse-width-modulation (PWM) inverter maintains a nearly constant DC link voltage but combines both voltage control and frequency control within the inverter itself. The power switches in the inverter are switched at a high-frequency thus operating, in effect, as choppers. In general, modulation techniques fall into two classes: those that operate at a fixed switching ratio to the fundamental switching frequency and those in which the switching ratio is continuously changing to synthesize a more nearly sinusoidal motor current (called sinusoidal PWM). In the first class, block modulation is the simplest type of modulation and is closest to simple six-step operation. Instead of varying the amplitude of the motor voltage waveform by variation of the DC link voltage, it is varied by switching one or two of the inverter switches at a fixed switching ratio to suit the speed. A simple form of block modulation is shown in FIG. 2, where the chopping is limited to the middle 60 electrical degrees of each device conduction period, resulting in minimum switching duty on the semiconductor switches. In spite of the similarities between block modulation and the six-step mode, the torque pulsations at low speed are much less severe than for the six-step inverter. However, the harmonics of a six-step inverter are also present with block modulation, but there are higher harmonics associated with the chopping frequency of block modulation mode. Hence, the motor losses and noise are significant compared to more elegant modulation algorithms. FIG. 3 shows the phase voltage and current waveforms. Even though the switches $T_{A+}$ and $T_{A-}$ are in their on state for 180 electrical degrees, due to the lagging power factor of the load, their actual conduction intervals are smaller than 180 electrical degrees.

The second class is the sinusoidal PWM, which is used to synthesize the motor currents as near to sinusoidal waveforms as possible. The lower voltage harmonics can be greatly attenuated, leaving typically only two or four harmonics of substantial amplitude close to the chopping or carrier frequency. With compared to the six-step operation, the motor can rotate much more smoothly at low speed, and the torque pulsations are virtually eliminated and the extra motor losses caused by the inverter are substantially reduced with sinusoidal PWM operation. However, to counterbalance these advantages, the sinusoidal PWM inverter control is complex, and the chopping frequency is high, which causes higher switching losses than the six-step operation. In order to approximate a sine wave, a high-frequency triangular wave is compared with a fundamental frequency sine wave as shown in FIG. 4.

Current control technique plays the most important role in current-controlled PWM inverters, which are widely applied in high-performance motor drives. Various techniques for current controller have been described in the following papers [1]–[7]:

[1] M. Lajoie-Mazenc, C. Villanueva, and J. Hector, "Study and implementation of hysteresis controlled inverter on a permanent magnet synchronous machine," *IEEE Trans. Ind. Applicat.*, vol. IA-21, no. 2, pp. 408–413, March/April 1985.

[2] D. M. Brod and D. W. Novotny, "Current control of VSI-PWM inverters," *IEEE Trans. Ind. Applicat.*, vol. IA-21, no. 3, pp. 562–570, May/June 1985.

[3] T. M. Rowan and R. J. Kerkman, "A new synchronous current regulator and an analysis of current-regulated PWM inverters," *IEEE Trans. Ind. Applicat.*, vol. IA-22, no. 4, pp. 678–690, July/August 1986.

[4] M. P. Kazmierkowski, M. A. Dzieniakowski, and W. Sulkowski, "Novel space vector based current controllers for PWM-inverters," *IEEE Trans. Power Electron.*, vol. 6, no. 1, pp. 158–166, January 1991.

[5] C. T. Pan and T. Y. Chang, "An improved hysteresis current controller for reducing switching frequency," *IEEE Trans. Power Electron.*, vol. 9, no. 1, pp. 97–104, 1994.

[6] L. Malesani and P. Tenti, "A novel hysteresis control method for current-controlled voltage-source PWM inverters with constant modulation frequency," *IEEE Trans. Ind. Applicat.*, vol. 26, no. 1, pp. 88–92, January/February 1990.

[7] S. Buso, S. Fasolo, L. Malesani, and P. Mattavelli, "A dead-beat adaptive hysteresis current control," *IEEE Trans. Ind. Applicat.*, vol. 36, no. 4, pp. 1174–1180, July/August 2000.

However, among these techniques, the hysteresis current controller (HCC) is a rather popular one because of its easy implementation, fast dynamic response, maximum current limit, and insensitivity to load parameter variations. Nevertheless, depending on load conditions, switching frequency may vary widely during the fundamental period, resulting in irregular inverter operation. This is mainly due to the interference between the commutations of the three phases, since each phase current not only depends on the corresponding phase voltage but is also affected by the voltages of the other two phases. Therefore, the actual current waveform is not only determined by the hysteresis control, but depends on operating conditions. The current slope may vary widely and the current peaks may appreciably exceed the limits of the hysteresis band. The inverter frequency may become much higher than is needed to meet the ripple and noise requirements, and the inverter switches must be rated accordingly. Moreover, high frequency and current peaking increase power loss and may affect system reliability. Some hysteresis current-control techniques applying the zero vector to reduce the number of switchings were reported recently [4]–[5]. Another approach is proposed to minimize the effects of interference between phases while maintaining all the advantages of the hysteresis methods. Due to reduced interference, phase-locked loop (PLL) control of the band amplitude is allowed, giving a constant switching frequency within the period [6]–[7]. However, the control algorithm is more complex and the main advantage of the HCC, i.e. the simplicity, is lost.

On the other hand, the space-vector-modulation (SVM) technique has two excellent features such that its maximum output voltage is 15.4% greater and the number of switchings is about 30% less at the same carrier frequency than the one obtained by the sinusoidal PWM method as described in the following papers and patents [8]–[12].

[8] K. Zhou and D. Wang, "Relationship between space-vector modulation and three-phase carrier-based PWM: A comprehensive analysis," *IEEE Trans. Ind. Electron.*, vol. 49, no. 1, pp. 186–196, February 2002.

[9] V. Blasko, "Analysis of a hybrid PWM based on modified space-vector and triangle-comparison method," *IEEE Trans. Ind. Applicat.*, vol. 33, pp. 756–764, May/June 1997.

[10] X. Xu and D. Deng, "Three phase inverter circuit with improved transition from SVPWM to six step operation," US patent, U.S. Pat. No. 5,552,977, Ford Motor Company, Sep. 3 1996.

[11] V. Blasko, "Hybrid pulse width modulation method and apparatus," US patent, U.S. Pat. No. 5,706,186, Allen-Bradley Company, Jan. 6 1998.

[12] B. H. Kwon, T. W. Kim, and J. H. Youm, "A novel SVM-based hysteresis current controller," *IEEE Trans. Power Electron.*, vol. 13, no. 2, pp. 297–307, March 1998.

The SVM technique confines space vectors to be applied according to the region where the output voltage vector is located. However, to obtain the zero-output-current error, the SVM technique requires a measurement of the counter emf vector which is not practical. The HCC can be utilized to make the output-current vector track the command vector with almost negligible response time and insensitivity to line voltage and load parameter variations. However, the HCC generates other vectors except space vectors required according to the region in the SVM technique. If the zero vector is applied to reduce the magnitude of the output-current vector, the line current is decreased with slow slope and the switching frequency is decreased. A SVM-based HCC utilizing all features of the HCC and SVM technique have been developed in [12].

In order to control three phase currents of the motor, an effective method is to measure those directly by three low value resistors or Hall-Effect current sensors. However, this approach is not economical. The number of sensors of the three-phase motor drive can be reduced to two if the motor windings are star connected. However, this method introduces errors in the estimation of the third phase current because of the discrepancies in the gain constants and the DC offset of the other two current sensors. An alternative way is to reconstruct three phase currents based on the measured dc-link current and PWM signals as described in the following papers and patents [13]–[21].

[13] P. P. Acarnley, "Observability criteria for winding currents in three-phase brushless DC drives," *IEEE Trans. Power Electron.*, vol. 8, no. 3, pp. 264–270, July 1993.

[14] C. D. French, P. P. Acarnley, and A. G. Jack, "Real-time current estimation in brushless DC drives using a single DC-link current sensor," *EPE Conf. Rec.*, 1993, pp. 445–450.

[15] J. F. Moynihan, S. Bolognani, R. C. Kavanagh, M. G. Egan, and J. M. D. Murphy, "Single sensor current control of AC servo drives using digital signal processors," *EPE Conf Rec.*, 1993, pp. 415–421.

[16] J. Zhang and M. Schroff, "Current control of three-phase brushless DC drives with DC-link current measurement," *Power Conv. Intell. Motion (PCIM) Conf Rec.*, pp. 141–148, June 1997.

[17] F. Blaabjerg, J. K. Pedersen, U. Jaeger, and P. Thoegersen, "Single current sensor technique in the DC link of three-phase PWM-VS inverters: A review and a novel solution," *IEEE Trans. Ind. Applicat.*, vol. 33, no. 5, pp. 1241–1253, September/October 1997.

[18] H. Tan and S. L. Ho, "A novel single current sensor technique suitable for BLDCM drives," in *Proc. IEEE-PEDS Conf,* 1999, pp. 133–138.

[19] L. Ying and N. Ertugrul, "A novel estimation of phase currents from DC link for permanent magnet AC motors," *Conf Rec.*, pp. 606–612, 2001.

[20] T. M. Wolbank and P. Macheiner, "An improved observer-based current controller for inverter fed AC machines with single DC-link current measurement," in *Proc. IEEE-PESC Conf,* 2002, pp. 1003–1008.

[21] Z. Yu, "Phase current sensor using inverter leg shunt resistor," US patent, U.S. Pat. No. 6,529,393, Texas Instruments Incorporated, Mar. 4 2003.

Based on the concept of SVM, an inverter feeding the motor has only eight possible switching states represented with two zero-states and six active-states. During the six active states, only one of three phase currents flows through the DC link. At two zero-states, however, the phase currents circulate in the inverter bridge though the diode, not passing through the DC link. Under PWM current control mode, there are two possible active-states in every modulation period. So, two-phase currents can be derived from the DC link current. However, under certain operating conditions of the PWM control, either two active-states may last very short period of time. Therefore, due to the finite switching time of the power devices, the dead time, and the delays in the electronic circuits, actual phase current may not be visible on the dc link measurement.

FIG. 5 is a block diagram of a conventional six-step motor driver in which the motor driver includes A-phase, B-phase, and C-phase upper side drive transistors 101, 103, and 105, U-phase, V-phase, and W-phase lower side drive transistors 102, 104, and 106, diodes 101D, 102D, 103D, 104D, 105D, and 106D, a Hall sensor circuit 201, a conventional six-step control circuit 202, a pre-drive circuit 203, and a current detection resistor 204. A motor includes a A-phase coil 301, a B-phase coil 302, and a C-phase coil 303.

In this embodiment N-type metal oxide semiconductor (NMOS) transistors are used as the drive transistors 101–106. The anode end and cathode end of the diode 101D are connected to the source terminal and drain terminal of the drive transistor 101 respectively. Likewise, the anode end and cathode end of the diode 102D–106D are connected to the source terminal and drain terminal of the drive transistors 102–106 respectively in the same manner. The drains terminal of the drive transistors 101, 103, and 105 are connected to the power supply Vcc, and the source terminals of the drive transistors 102, 104, and 106 are connected to one end of the current detection resistor 205. The other end of the current detection resistor 204 is grounded. The arm of the drive transistors 101–102 and the diodes 101D–102D operate as a A-phase output circuit, the arm of the drive transistors 103–104 and the diodes 103D–104D operate as a B-phase output circuit, and the arm of the drive transistors 105–106 and the diodes 105D–106D operate as a C-phase output circuit. The common node of the source terminal of the transistor 101 and the drain terminal of the transistor 102 is connected to one terminal of the A-phase coil 301. Likewise, the common node of the source terminal of the transistor 103 and the drain terminal of the transistor 104 is connected to one terminal of the B-phase coil 302, and the common node of the source terminal of the transistor 105 and the drain terminal of the transistor 106 is connected to one terminal of the C-phase coil 303. The other terminals of the A-phase coil 301, the B-phase coil 302, and the C-phase coil 303 are connected to one another.

The current flowing from the drive transistors 101–102 toward to the A-phase coil 301 is called a A-phase current $I_A$. Likewise, the current flowing from the drive transistors 103–104 toward to the B-phase coil 302 is called a B-phase current $I_B$, and the current flowing from the drive transistors 105–106 toward to the C-phase coil 303 is called a C-phase current $I_C$. The direction of all the phase currents $I_A$, $I_B$, and $I_C$ toward from the drive transistors 101–106 toward to the coils 301–303 is assumed as the positive direction for all the phase currents. The coils 301–303 of the motor 300 are in Y connection. Therefore, the respective phase currents are equal to currents flowing through the corresponding coils.

The Hall sensor circuit 201 includes Hall sensors 201A, 201B, and 201C, which detect the position of a rotor of the motor 300 and output the detection results to the position detection circuit and current command generation circuit 22 as Hall sensors 201A, 201B, and 201C output H1+, H1−, H2+, H2−, H3+, and H3−. The conventional six-step control circuit 202, which receives the Hall sensor outputs H1+, H1−, H2+, H2−, H3+, and H3−, a torque command signal TC, and a feedback current signal Ifb, generates switching control signals S11-S16 to select any of the drive transistors 101–106 to be turned on or off, and sends instructions to the pre-drive circuit 203. The pre-drive circuit 203 outputs signals to the gates of the drive transistors 101–106 according to the outputs of the conventional six-step control circuit 202 in order to control ON/OFF of the drive transistors 101–106.

FIG. 6 is a block diagram of a conventional six-step control circuit in which the six-step control circuit includes differential amplifiers 401A, 401B, and 401C, auto gain control circuits 402A, 402B, and 402C, adders 403A, 403B, and 403C, multipliers 404A, 404B, and 404C, comparators 405A, 405B, 405C, 412A, 412B, and 412C, a low pass filter 406, a peak detection circuit 407, an adder 408, controller 409, a carrier signal generator 410, and a dead time control circuit 411. Differential amplifiers 401A, 401B, and 401C, which receive the Hall sensor outputs H1+, H1−, H2+, H2−, H3+, and H3− respectively, determines the position signals Ha, Hb, and Hc based on the Hall sensor outputs H1+, H1−, H2+, H2−, H3+, and H3−, and outputs the position signals Ha, Hb, and Hc to the auto gain control circuits 402A, 402B, and 402C. The auto gain control circuits 402A, 402B, and 402C adjust the magnitudes of the position signals Ha, Hb, and Hc and then generate signals H11, H21, and H31. The adders, which receive signals H11, H21, and H31, generate signals H13, H23, and H33 to the comparators 412A, 412B, and 412C respectively. The low pass filter 406, which receive a current feedback signal Ifb, outputs a signal to the peak detection circuit 407. The adder 408, which receives the torque command signal TC and the detection result generated by the peak detection circuit 407, outputs the error signal to the controller 409. The multipliers 404A, 404B, and 404C, which receive the output signal of the controller 409 and the output signals of the comparators 412A, 412B, and 412C respectively, output the results to the comparators 405A, 405B, and 405C respectively. The dead time control circuit 411 determines the switching control signals S11–S16 based on the outputs of the comparators 405A, 405B, and 405C.

FIG. 6 shows the control block diagram of the conventional current control architecture for spindle motors. The fundamental of this control scheme is similar to the open loop voltage/frequency control. The amplitudes and phases of the voltages are controlled separately. There are several limitations of this control scheme. Since the dc-link current depends on the PWM signals, a discontinuous current is measured as current feedback as shown in FIG. 7. After detecting the peak value of the dc-link current, a continuous current feedback can be generated as shown in FIG. 7. However, the generated current feedback contains large ripples, which may cause poor current control performance, even at steady-state operations. Besides, the control parameters of the current controller 409 shown in FIG. 6 are required to be tuned for improving the control performance when applying to different motors. FIG. 8 shows the simulation results of current control performance with the conventional six-step control architecture.

FIG. 9 shows the control block diagram of the modified six-step control circuit. Three comparators 412A, 412B, and 412C are omitted from FIG. 6. FIG. 10 shows the simulation waveforms of current control performance with the modified six-step control architecture. Since only the amplitude of the maximum phase current is controlled, the controlled phase current is similar to a trapezoidal waveform as shown in FIG. 10. Besides, because of the non-sinusoidal phase currents, the generated torque contains a torque ripple, which may cause the motor oscillation and may degrade the efficiency.

The conventional approach, either the block modulation or the sinusoidal PWM, suffers from a problem that only the amplitude of the maximum current can be controlled. Therefore, the shape of the phase current cannot be controlled. In U.S. Pat. No. 6,674,258, Matsushita Electric Industrial Co. has proposed a current control architecture which can control two phase currents within one PWM switching period. FIG. 11 shows the overall control block diagram of the Matsushita's approach. For simplicity, three trapezoidal current commands are generated as shown in FIG. 12.

Take the time interval TU1 in FIG. 12 as an example to explain the fundamental of this control approach. During this time interval, the terminal voltage for the phase a is forced to $V_{cc}$ as shown in FIG. 13(a), and the phase current $i_a$ is required to be controlled to the torque current command TI. Since only one phase current can be sensed from the dc-link current, the other two terminal voltages are switched to ground for sensing the phase current $i_a$ at the beginning of one PWM switching period as also shown in FIG. 13(a). As $i_a$ reaches the torque current command, the lower switch of phase b is turned off by the control signal F1, and the phase current $i_b$ flows through the diode 3D of the upper switch as shown in FIG. 13(b). After F1 switched off, the negative of the phase current $i_c$ can be sensed from the dc-link current, and is controlled to follow the ramp current command TP as shown in FIG. 14(a)–14(b). As the negative $i_c$ reaches the ramp current command TP, the lower switch of phase 3 is turned off by the control signal F2, and the phase current $i_c$ flows through the diode SD of the upper switch as shown in FIG. 13(c). In theory, this approach can not only control the amplitude of the maximum phase current, but also can control the shape of one of the other two phase currents during one PWM switching period. FIG. 15 shows the simulation results of the Matsushita's approach. From this figure, the generated torque contains a large torque ripple because of the non-sinusoidal current waveforms. It should be noted that the controlled phase currents are not the desired ideal trapezoidal waveforms as shown in FIG. 12. The reasons will be explained in the following paragraph.

In practice, this approach has a fundamental problem for controlling two phase currents within one PWM switching period. Again, take the time interval TU1 in FIG. 12 as an example. In the beginning of the PWM switching period, phase current $i_a$ is controlled towards to the torque current command TI. However, in the meanwhile, the negative of the phase current $i_c$ also increases as shown in FIG. 16. When the phase current $i_a$ reaches the command, the phase current $i_c$ may already exceed the ramp current command as indicated in FIG. 16. Hence the shape of the phase current $i_c$ can not be controlled until the ramp current command exceeds the negative of the phase current $i_c$. FIG. 17(a) indicates that even the current commands are three sinusoidal waveforms, this fundamental problem may still occur. Another observation can be made from FIG. 17(b) that if the controllable current shape is $i_b$ instead of $i_c$ the phase current $i_b$ can be controlled until the current command is lower than the negative of the phase current $i_b$. Therefore, one reasonable solution for this fundamental problem is to control $i_a$ and $i_b$ in the first half of TU1 and to control $i_a$ and $i_c$ in the second half of TU1. Mathematical analyses will be given to explain the fundamental problem of this approach in the following section.

From FIG. 13(a), three phase voltage equations can be derived as follows:

$$v_{an} = v_a - v_n = V_{cc} - \frac{1}{3}(V_{cc} + 0 + 0) = i_a R + L\frac{di_a}{dt} + e_a \quad (2)$$

$$v_{bn} = v_b - v_n = 0 - \frac{1}{3}(V_{cc} + 0 + 0) = i_b R + L\frac{di_b}{dt} + e_b \quad (3)$$

$$v_{cn} = v_c - v_n = 0 - \frac{1}{3}(V_{cc} + 0 + 0) = i_c R + L\frac{di_c}{dt} + e_c \quad (4)$$

where $v_{an}$, $v_{bn}$, $v_{cn}$ are three phase voltages, $v_a$, $v_b$, $v_c$ are three terminal voltages, $V_{cc}$ is the dc-link supply voltage, $i_a$, $i_b$, $i_c$ are three phase currents, $e_a$, $e_b$, $e_c$ are three back-emf voltages, R and L are the stator resistance and inductance. From the above equations, the variance of the phase currents can be estimated as $$\Delta i_{a1} = \frac{1}{L}\left(\frac{2}{3}V_{cc} - e_a - i_a R\right) \quad (5)$$

-continued $$\Delta i_{b1} = \frac{1}{L}\left(-\frac{1}{3}V_{cc} - e_b - i_b R\right) \quad (6)$$

$$\Delta i_{c1} = \frac{1}{L}\left(-\frac{1}{3}V_{cc} - e_c - i_c R\right) \quad (7)$$

Similar analyses can be done for FIG. 13(b) as $$\Delta i_{a2} = \frac{1}{L}\left(\frac{1}{3}V_{cc} - e_a - i_a R\right) \quad (8)$$

$$\Delta i_{b2} = \frac{1}{L}\left(\frac{1}{3}V_{cc} - e_b - i_b R\right) \quad (9)$$

$$\Delta i_{c2} = \frac{1}{L}\left(-\frac{2}{3}V_{cc} - e_c - i_c R\right) \quad (10)$$

and for FIG. 13(c) as $$\Delta i_{a0} = \frac{1}{L}(-e_a - i_a R) \quad (11)$$

$$\Delta i_{b0} = \frac{1}{L}(-e_b - i_b R) \quad (12)$$

$$\Delta i_{c0} = \frac{1}{L}(-e_c - i_c R) \quad (13)$$

Define the time interval for FIG. 13(a)–(c) as $\Delta t_{n1}$, $\Delta t_{n2}$, and $\Delta t_{n3}$, where n denotes n-th switching period within the time interval TU1. The phase current $i_c$ at the k-th switching instant can be derived as follows:

$$i_{ck} = \sum_{n=1}^{k}(\Delta i_{cn1}\Delta t_{n1} + \Delta i_{cn2}\Delta t_{n2} + \Delta i_{cn0}\Delta t_{n0}) \quad (14)$$

From (7), (10), and (13), (14) can be derived as $$i_{ck} = \frac{-1}{L}\sum_{n=1}^{k}\left[\frac{1}{3}V_{cc}(\Delta t_{n1} + 2\Delta t_{n2}) + e_{cn}\Delta T_{sw} + i_{cn}R\Delta T_{sw}\right] \quad (15)$$

where $\Delta T_{sw}$ denotes the switching period, which is also the summation of $\Delta t_{n1}$, $\Delta t_{n2}$, and $\Delta t_{n0}$. With the trapezoidal current waveforms as shown in FIG. 12, the phase current command $i_c^*$ at the k-th switching instant can be derived as follows:

$$i_{ck}^* = -\sum_{n=1}^{k}\Delta i_c^*\Delta T_{sw} = -\frac{P\omega_0}{20}i^*\Delta T_{sw} \quad (16)$$

where P denotes the poles of the spindle motor, and $\omega_0$ denotes the rotating speed at the first switching instant, and i* denotes the amplitude of the current command, respectively. As discussed before, if we want to control the phase current $i_c$ to follow the current command $i_c^*$ within the time interval of TU1, then we have $$i_{ck} \geq i_{ck}^* \quad (17)$$

By substitute (15) and (16) into (17), the condition of (17) can be rewritten as $$\sum_{n=1}^{k} \left[ \frac{1}{3} V_{cc} \left( 1 + \frac{\Delta t_{n2}}{\Delta T_{sw}} - \frac{\Delta t_{n0}}{\Delta T_{sw}} \right) + (e_{cn} + i_{cn} R) \right] \leq \frac{P \omega_0 L}{20} i^* \quad (18)$$

If the equation (18) stands at k-th switching instant, the phase current $i_c$ can be controlled to follow the current command $i_c^*$ after k-th switching instant within the time interval of TU1. Hence the equation (18) is the condition for determining whether the shape of the phase current $i_c$ is controllable or not. Some observations can be made from (18) as follows. Within the time interval of TU1, the first term in the left-hand side of (18) is positive and the second term is negative, that is:

$$0 < \frac{1}{3} V_{cc} \left( 1 + \frac{\Delta t_{n2}}{\Delta T_{sw}} - \frac{\Delta t_{n0}}{\Delta T_{sw}} \right) < \frac{1}{3} V_{cc} \quad (19)$$

$$e_{cn} + i_{cn} R < 0 \quad (20)$$

The right-hand side of (18) is directly proportional to the rotating speed $\omega_0$ and the amplitude $i^*$ of the phase current. Therefore, the equation (18) is much easier to be satisfied at higher speeds than at lower speeds as shown in FIG. 18(a)–18(b). Assume that the back-EMF voltage and the phase current are both in sinusoidal shapes, and can be derived for the time interval TU1 as follows $$e_{cn} = -K_E \omega_n \sin\left( \frac{60 n \Delta T_{sw}}{\frac{20}{P\omega_0}} \right) = -K_E \omega_n \sin(3 P \omega_0 n \Delta T_{sw}) \quad (21)$$

$$i_{cn} = -i^* \sin(3 P \omega_0 n \Delta T_{sw}) \quad (22)$$

At low-speeds, the right-hand side of (18) is approximately zero. Therefore for the negative summation in the left-hand side of (18), we have $$(K_E \omega_n + i^*) \sin(3 P \omega_0 n \Delta T_{sw}) \geq \frac{1}{3} V_{cc} \left( 1 + \frac{\Delta t_{n2}}{\Delta T_{sw}} - \frac{\Delta t_{n0}}{\Delta T_{sw}} \right) \quad (23)$$

From the condition of (23), one concluding mark can be made that the equation (23) can be only satisfied with a sufficiently large n at low-speed operations, that is, controlling the shape of the phase current $i_c$ is not possible within the whole time interval of TU1 at low-speed operations. This phenomenon may induce torque ripple to affect the overall control performance.

From the above analyses, the concept of the Matsushita's approach has several advantages. First, not only the amplitudes, but also the shapes of the phase currents are possible to be controlled to reduce the torque ripple. Second, no control parameter is required to be tuned. Third, only two phases are required to be switched at any instant, hence the switching losses of the power transistors can be reduced. However, the Matsushita's approach consists of a fundamental problem for controlling the current shapes. Therefore, new control architecture is proposed to reserve the advantages and improve the weakness of the Matsushita's approach.

SUMMARY OF THE PRESENT INVENTION

A main object of the present invention is to provide a motor drive technology of a space vector-based current controlled PWM system which is capable of controlling a plurality of phase currents not to change sharply with only a dc-link current feedback.

Another object of the present invention is to provide a motor driver based on a space vector-based current controlled PWM technology. In the motor driver, not only the amplitudes but also the shapes of the phase currents are possible to be controlled to reduce the torque ripple.

Another object of the present invention is to provide a motor driver based on a space vector-based current controlled PWM technology. In the motor driver, only two phases are required to be switched at any instant. Hence the switching losses of the power transistors can be reduced.

Accordingly, in order to accomplish the one or some or all above objects, the present invention provides a motor drive, comprising:

a plurality of output circuits each having an upper side switch and a lower side switch connected in series for supplying a current to a motor from a connection point between the upper side switch and the lower side switch of each output circuit;

a current detection resistor connected in series with the plurality of output circuits in common for detecting a current supplied to the plurality of output circuits;

a position detection circuit for outputting a position signal corresponding to a position of a rotor of the motor;

a current command generation circuit for generating a target current command signal based on the position signal and a predetermined phase angle in which a phase angle of the target current command signal is determined by the predetermined phase angle; and a space vector modulation based logic control circuit for commanding a plurality of output circuits that are set in a plurality of switches states for control of an electric motor, wherein the space vector modulation based logic control circuit commands the switches to generate patterns of the switch states according to the target current command signal, the position signal, and a feedback current signal generated at the current detection resistor so that each of a plurality of periods obtained by dividing a time period corresponding to the patterns of the switch states includes a first period in which a voltage vector as a function of the target current command signal, the position signal, and the feedback current signal is to determine the switch states of the plurality of output circuits and a second period in which the voltage vector as a function of the target current command signal, and the feedback current signal is to determine the switch states of the plurality of output circuits.

One or part or all of these and other features and advantages of the present invention will become readily apparent to those skilled in this art from the following description wherein there is shown and described a preferred embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

FIG. 26 shows the look-up table of the SVM based logic control circuit according to a first preferred embodiment of the present invention.

FIGS. 30–35 illustrate an alternative mode of the above preferred embodiment of the present invention.

DETAILED DESCRIPTION OF THE PREFERRED EMBODIMENT

Figure 1:
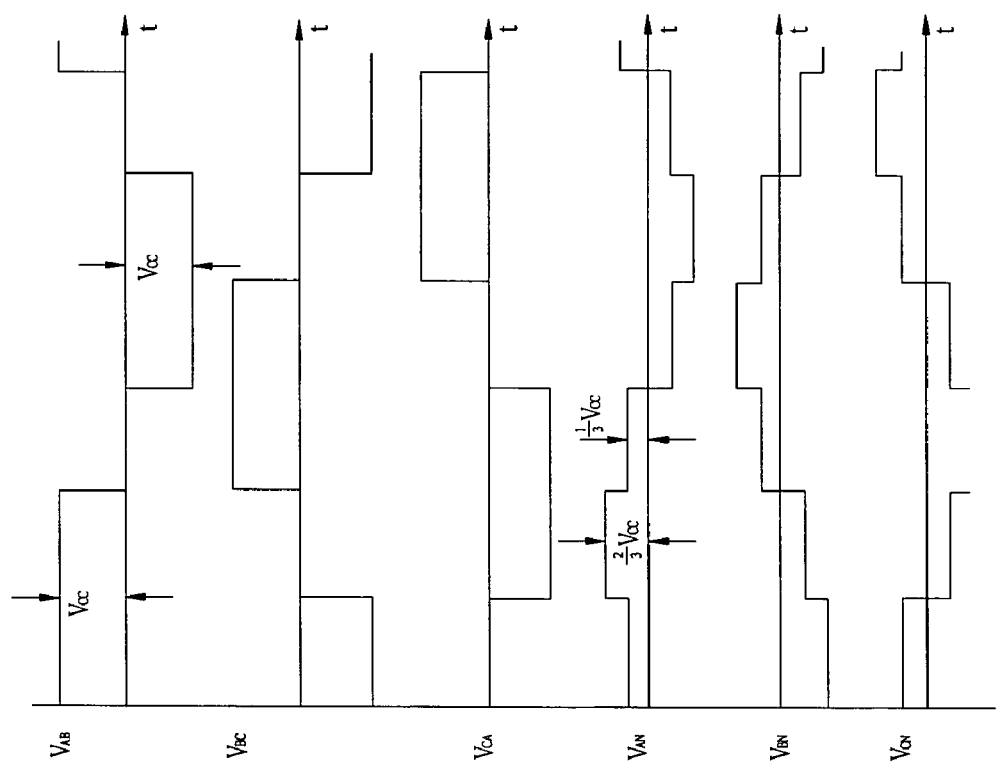
FIG. 1 is the waveform of the line-to-line voltages and line-to-neutral voltages with a six-step voltage source inverter.
Figure 2:
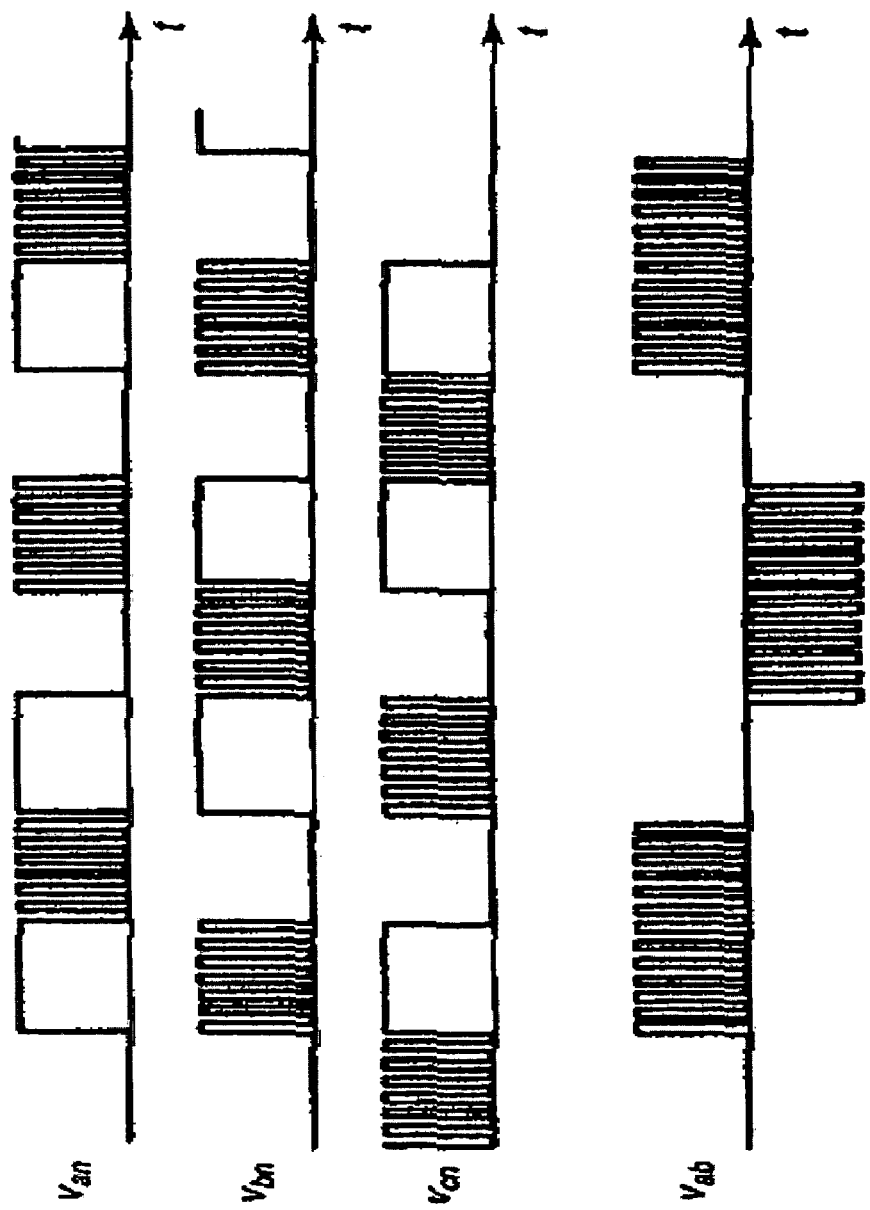
FIG. 2 is a typical voltage waveforms of the block modulation.
Figure 3:
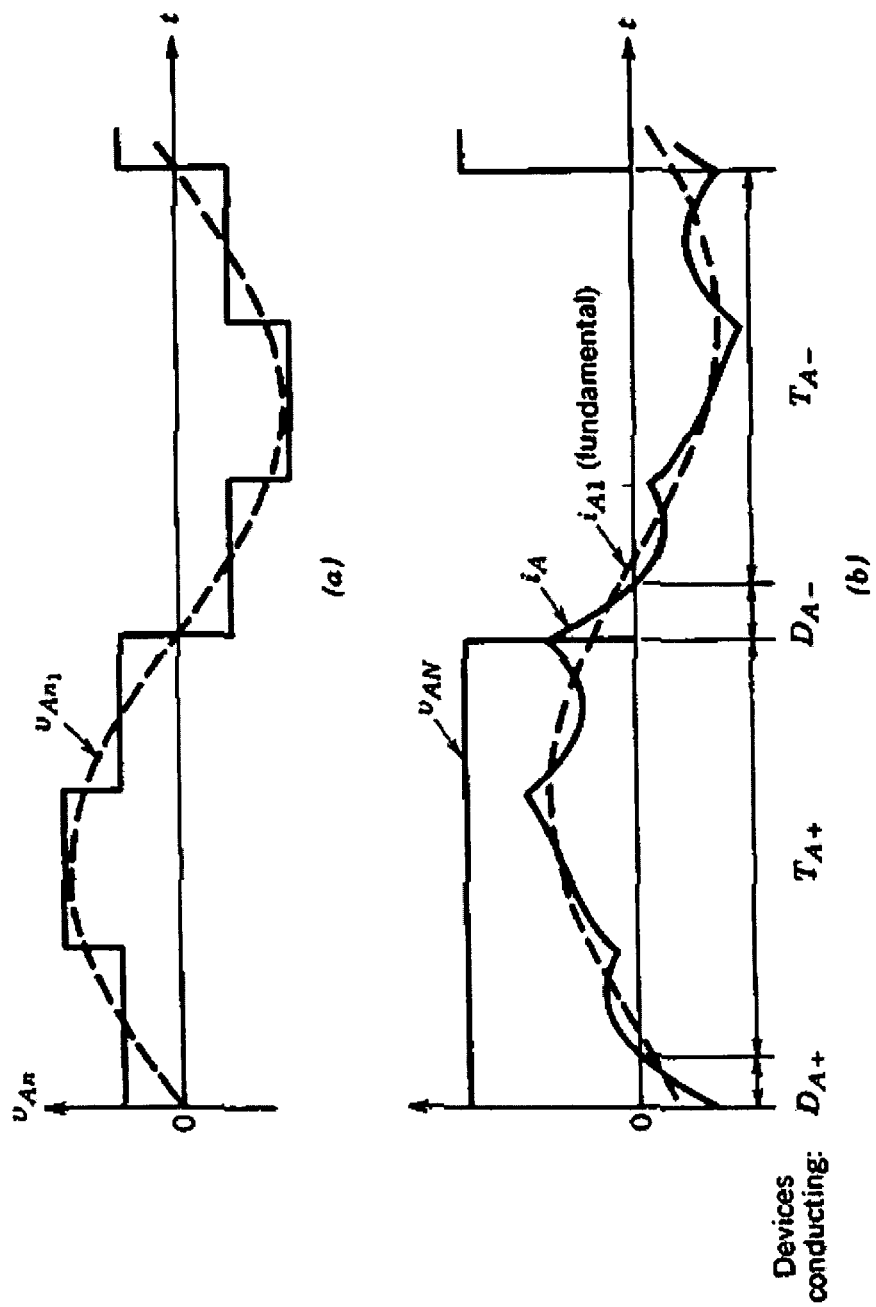
FIG. 3 shows the phase voltage and current waveforms of the six-step voltage source inverter.
Figure 4:
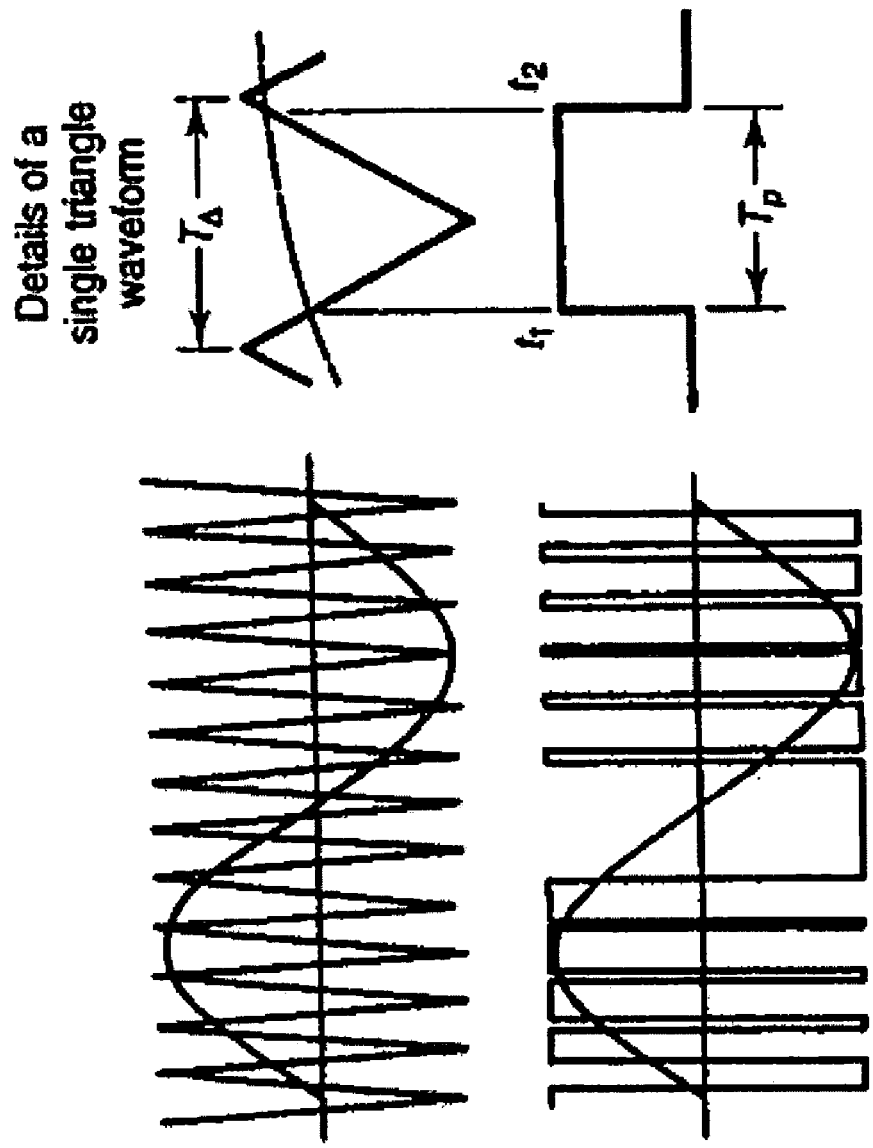
FIG. 4 illustrates of a sinusoidal PWM technique.
Figure 5:
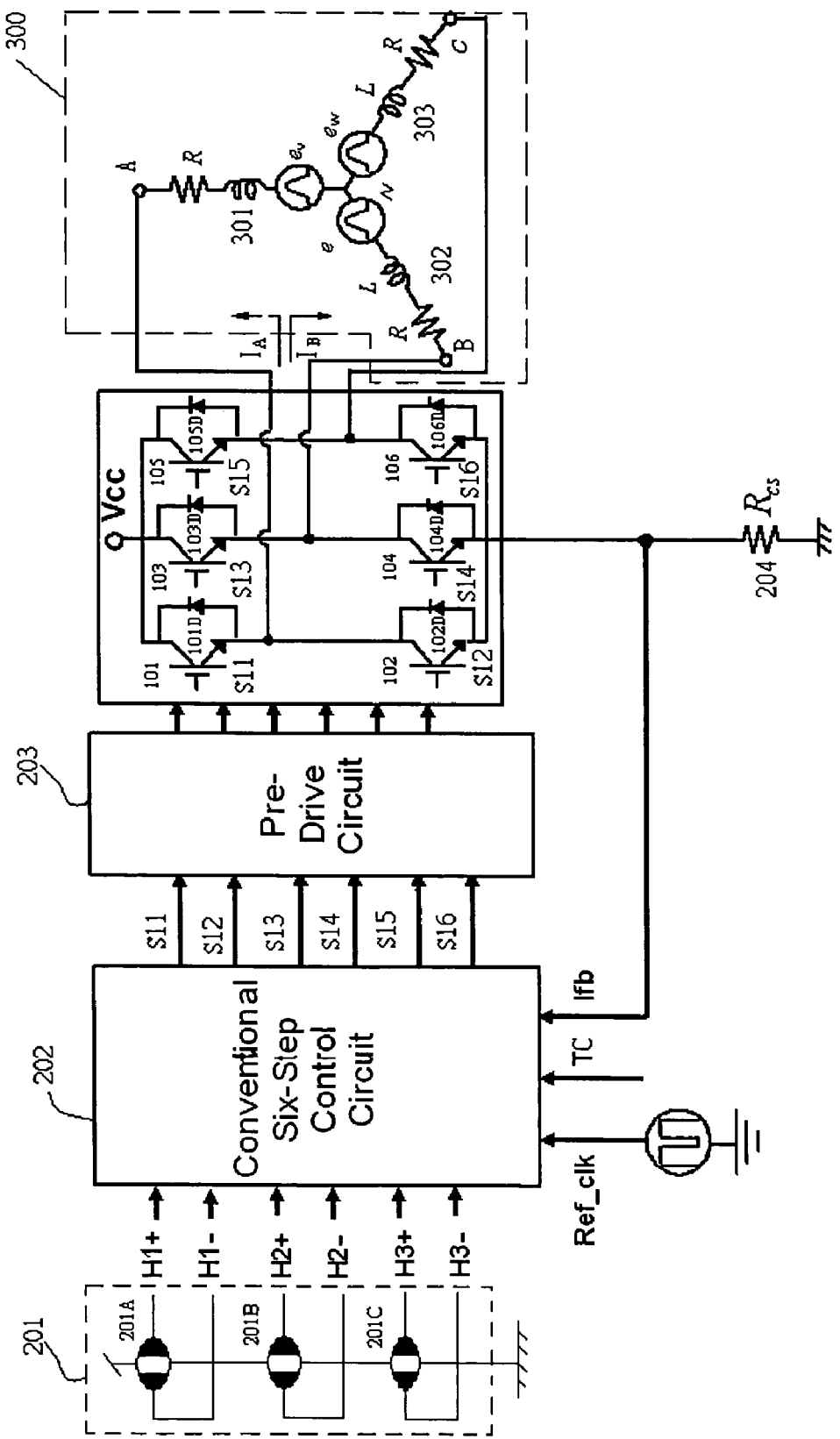
FIG. 5 is a block diagram of a conventional six-step motor driver.
Figure 6:
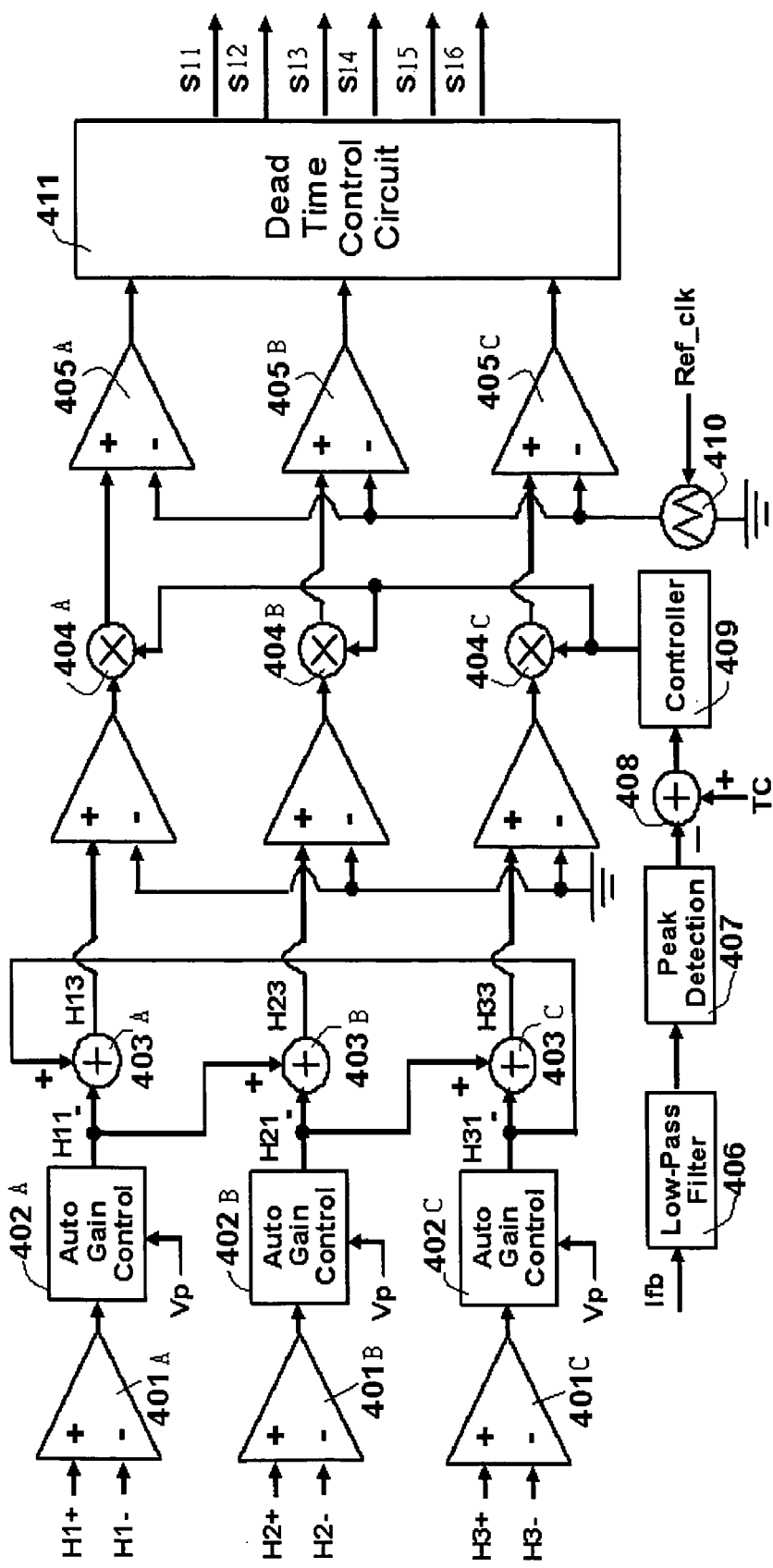
FIG. 6 is a block diagram of a conventional six-step control circuit.
Figure 7:
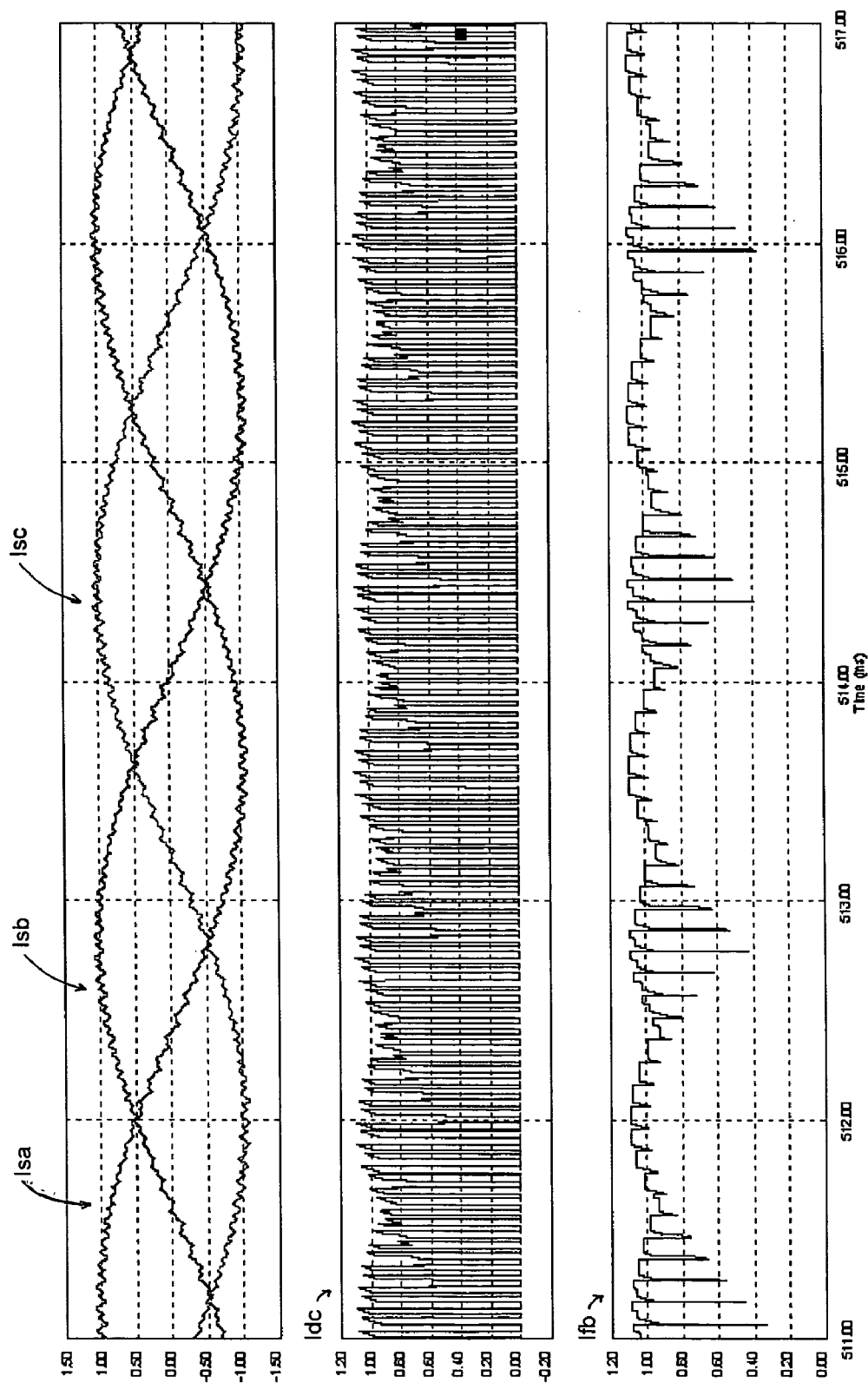
FIG. 7 shows simulation waveforms of the dc-link current and peak detection output current.
Figure 8:
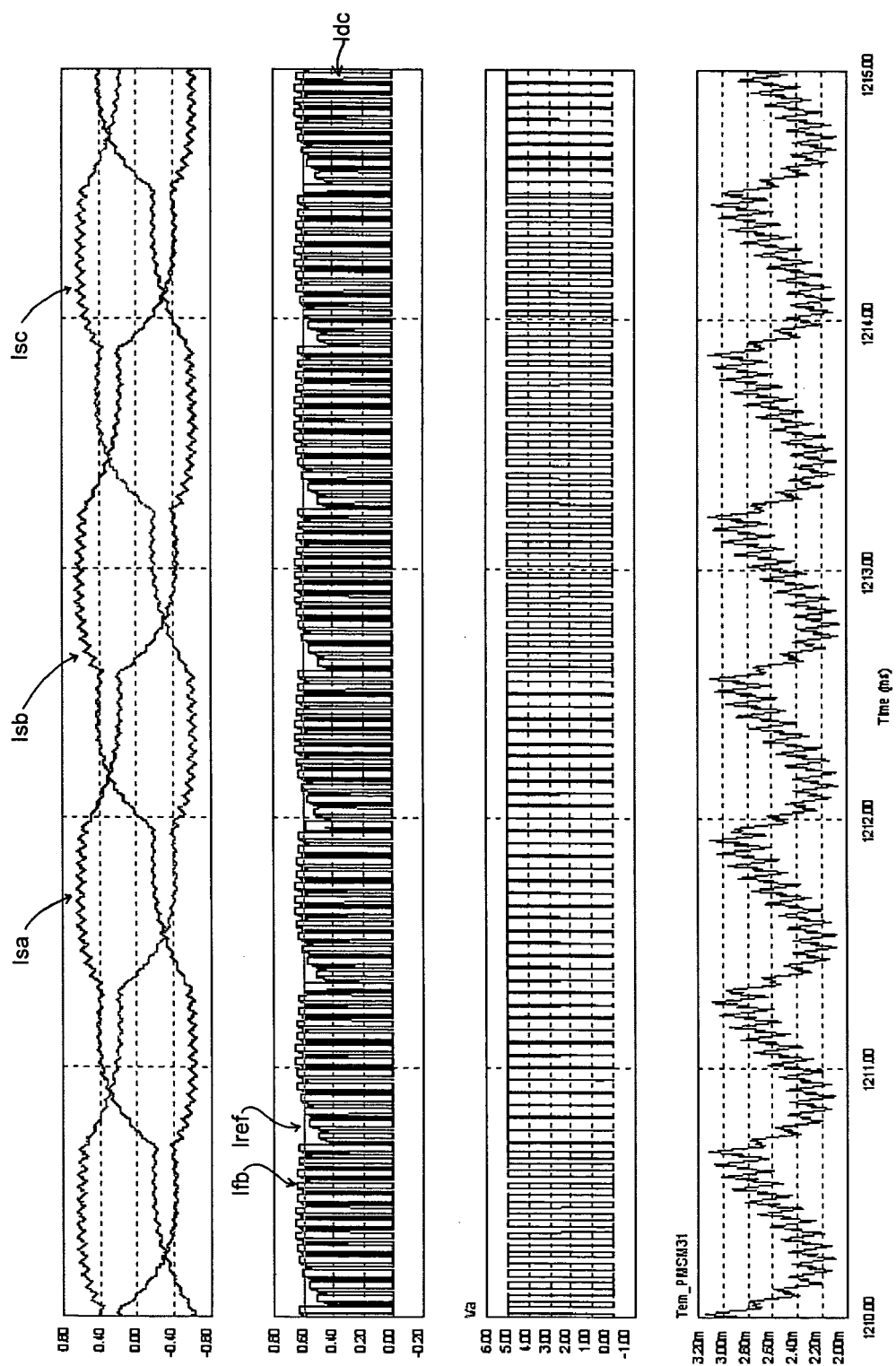
FIG. 8 shows simulation waveforms of current control performance with the conventional six-step control architecture.
Figure 9:
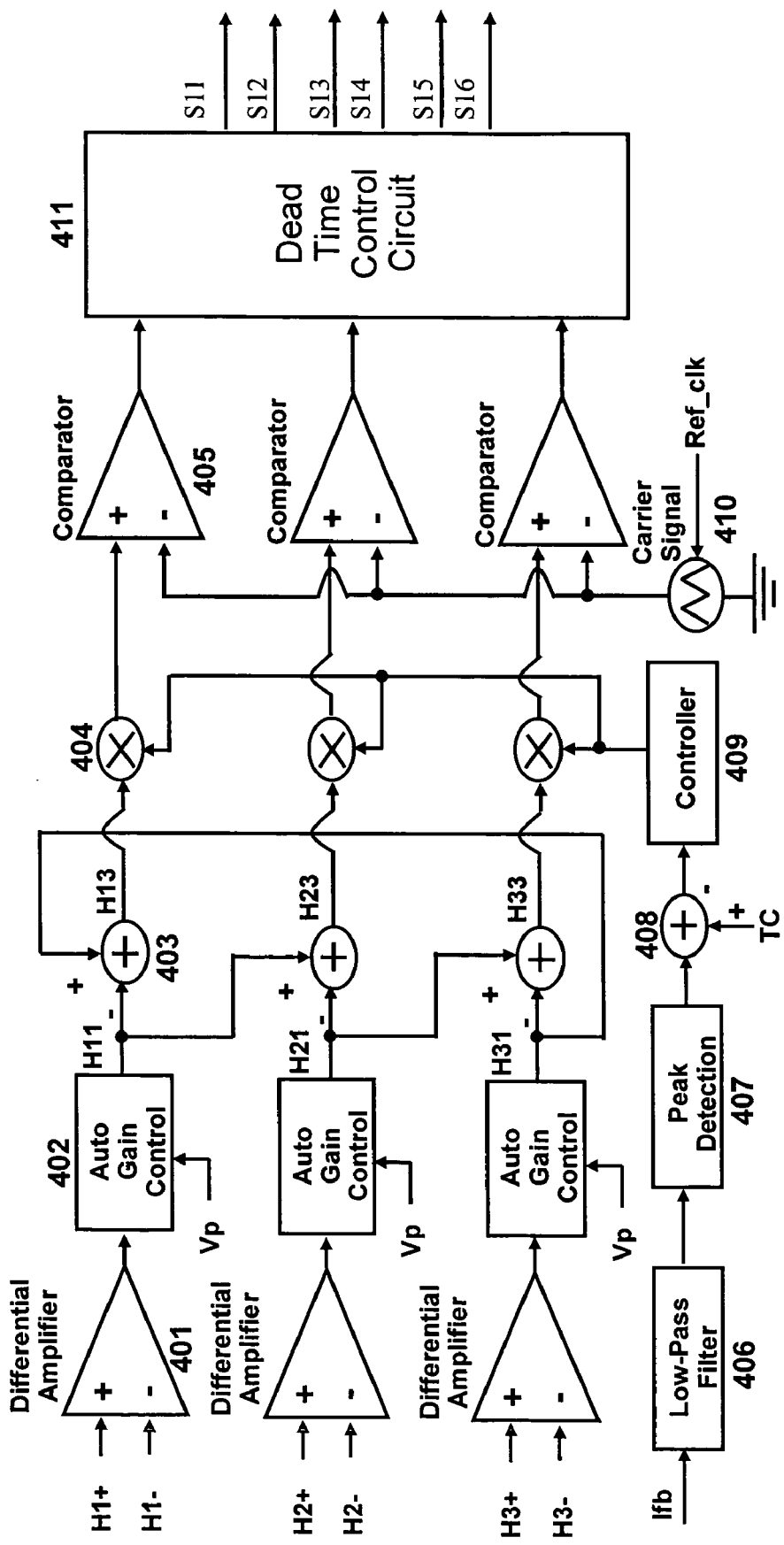
FIG. 9 is a block diagram of a modified six-step control circuit.
Figure 10:
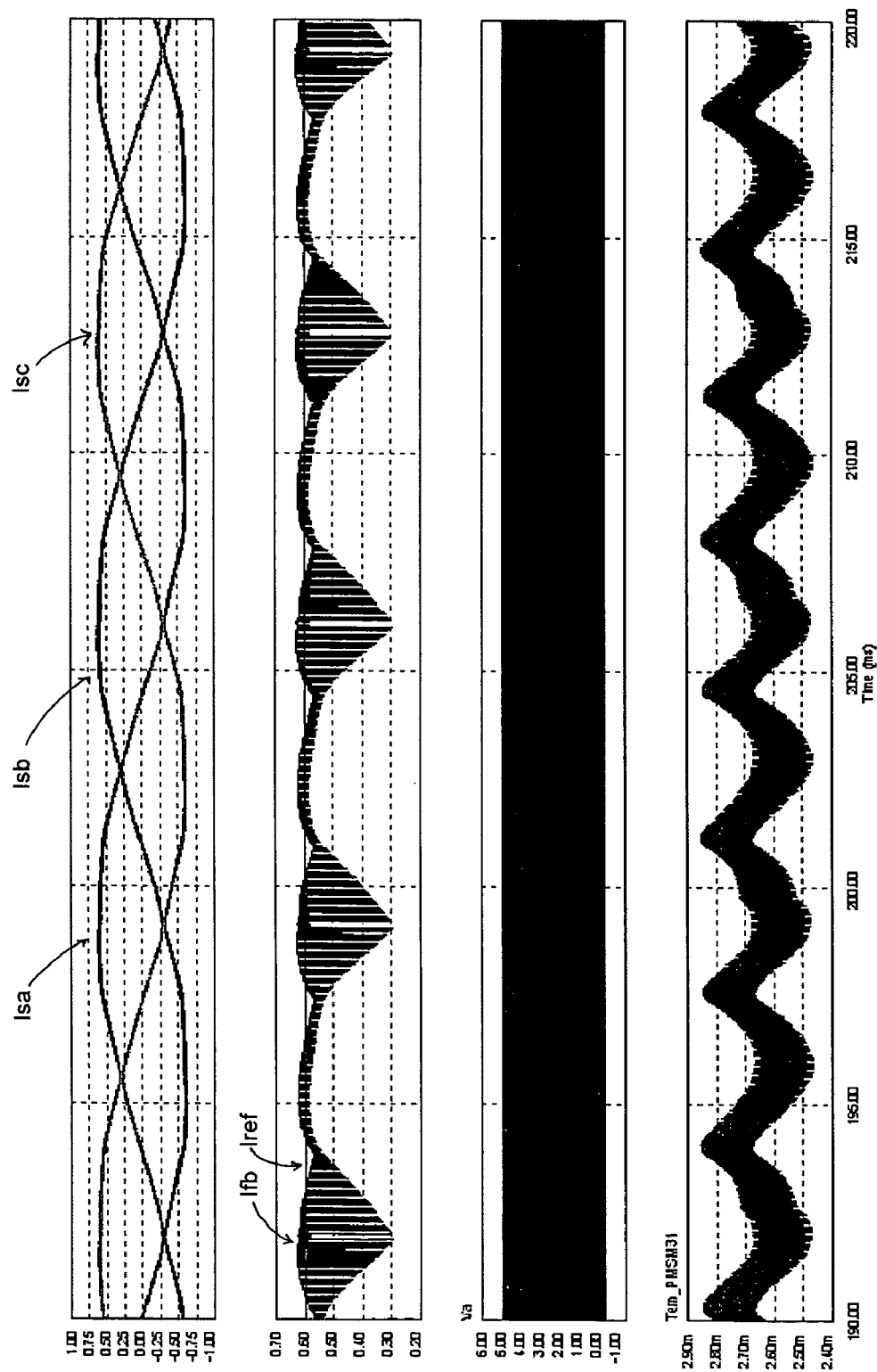
FIG. 10 shows simulation waveforms of current control performance with the modified six-step control architecture.
Figure 11:
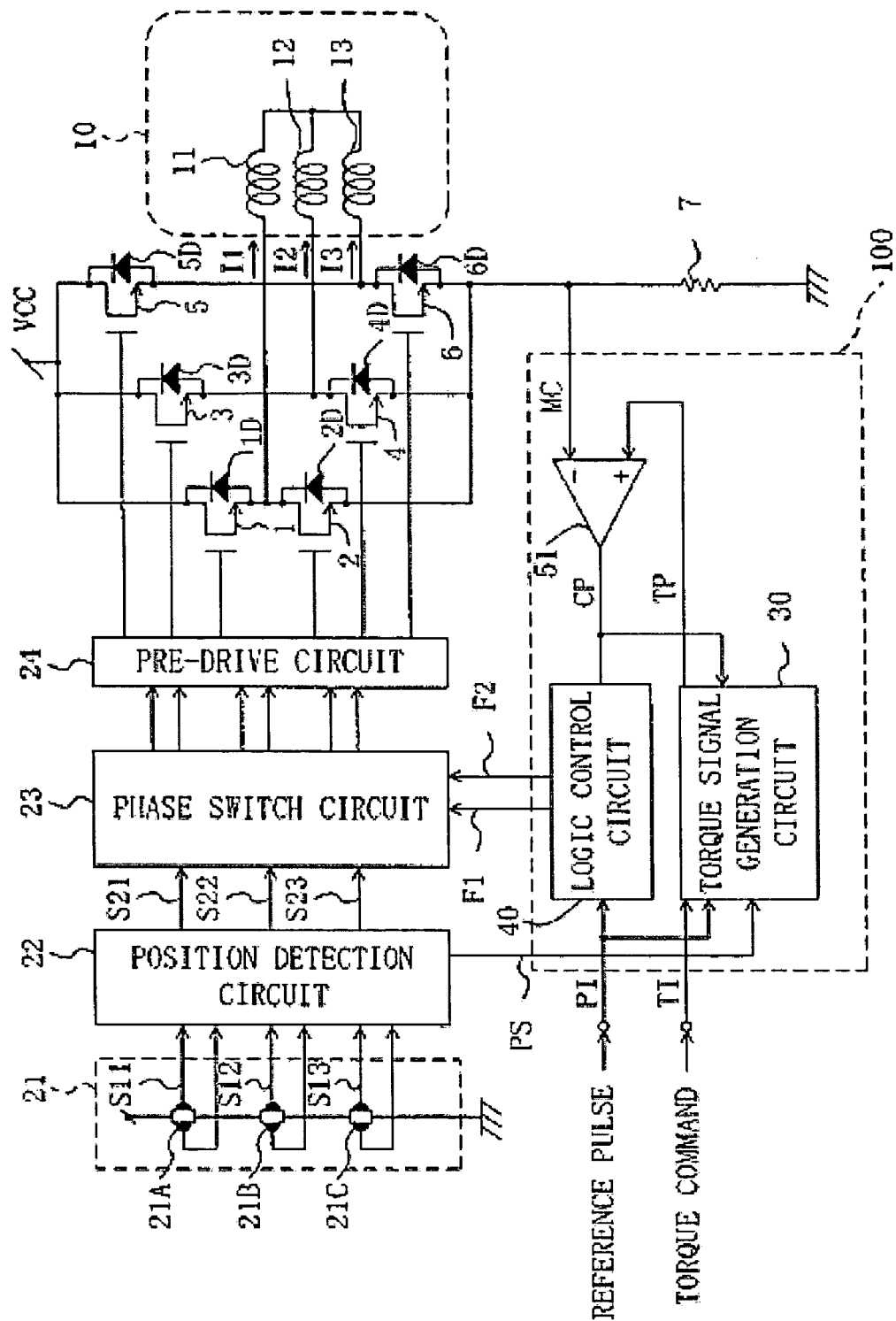
FIG. 11 shows the overall control block diagram of the Matsushita's approach.
Figure 12:
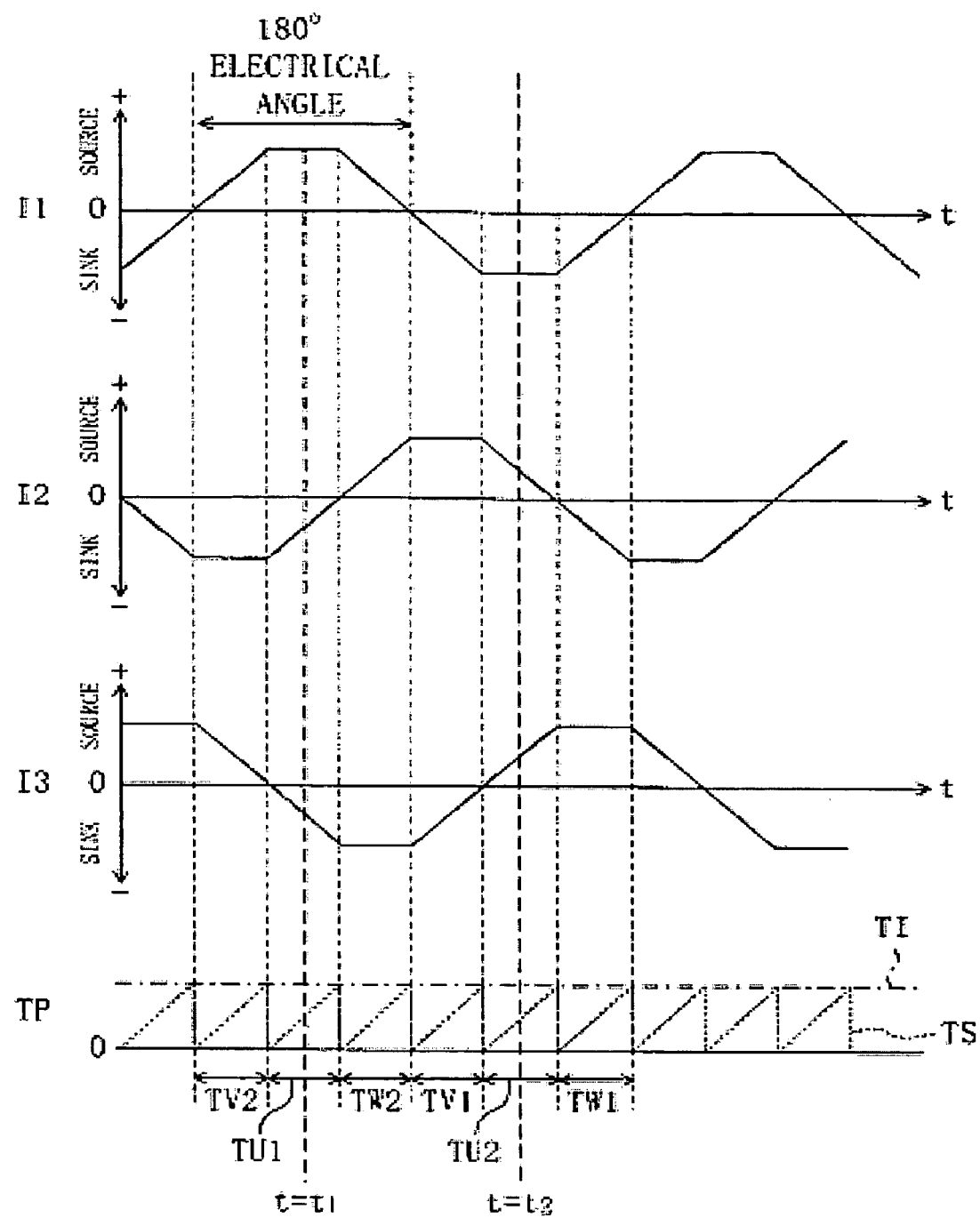
FIG. 12 shows three trapezoidal current commands of the Matsushita's approach.
Figure 13:
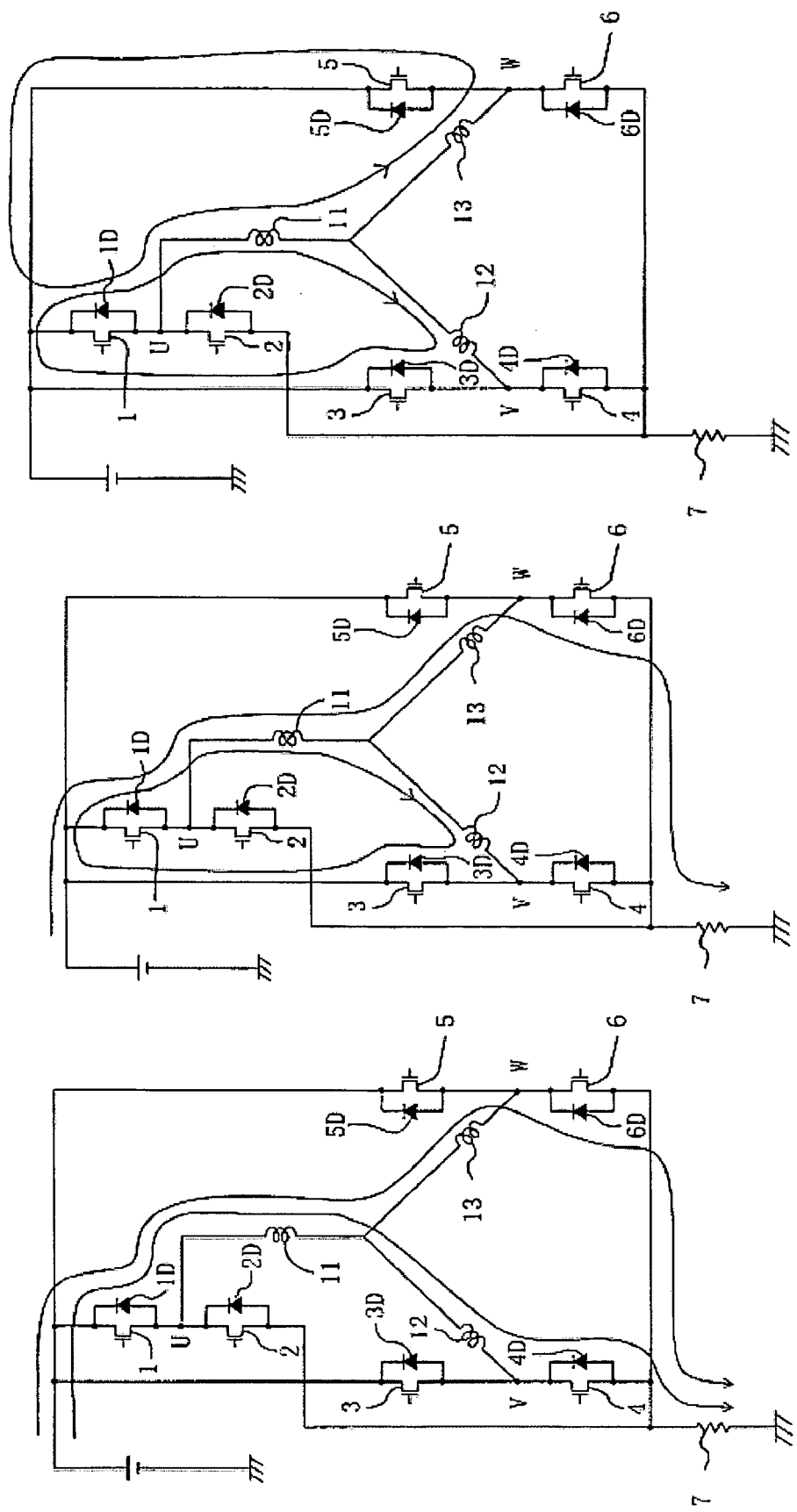
FIG. 13 is an illustration of routes of currents flowing through the motor of the Matsushita's approach.
Figure 14:
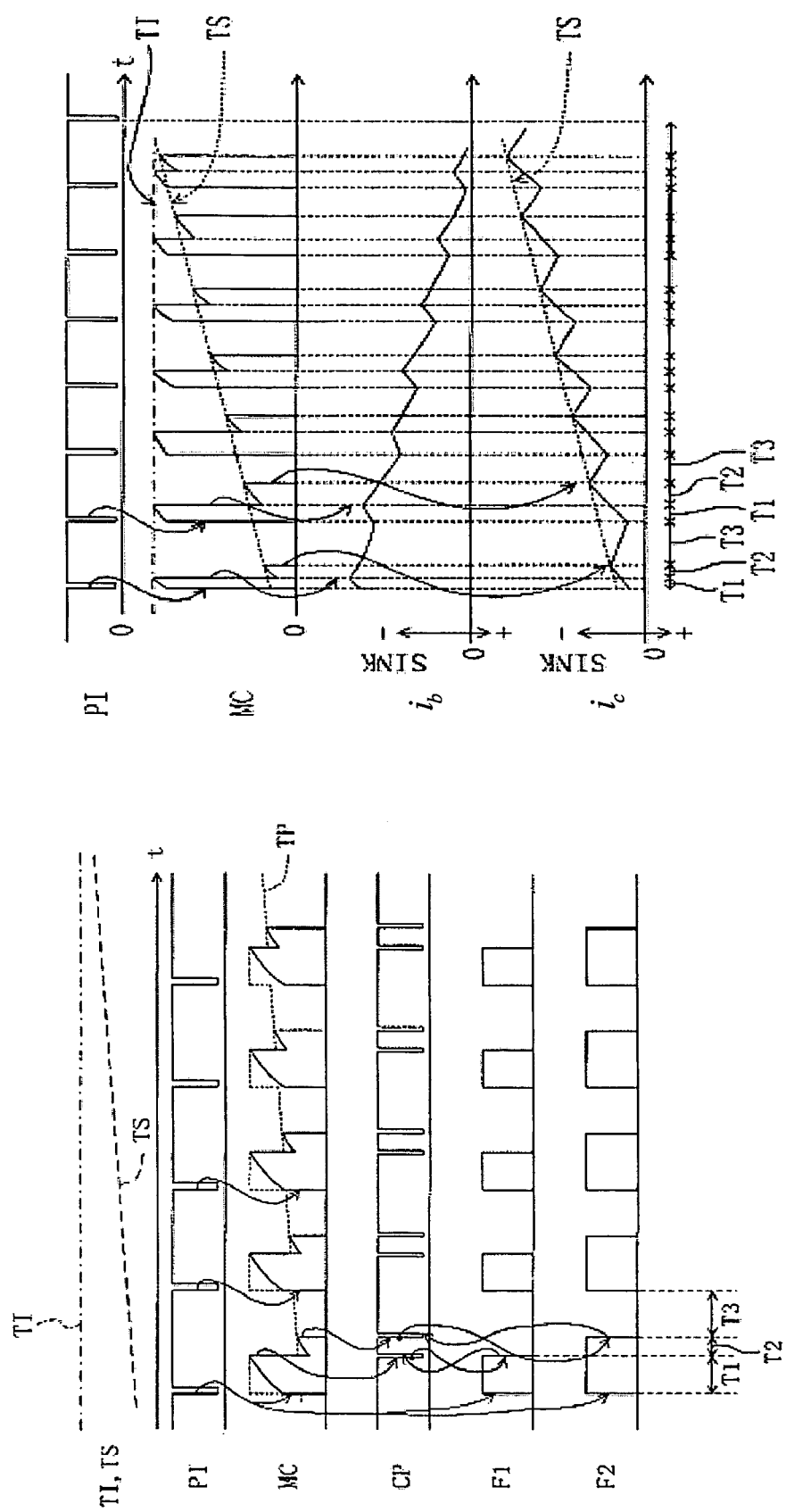
FIG. 14 shows waveforms of the Matsushita's approach.
Figure 15:
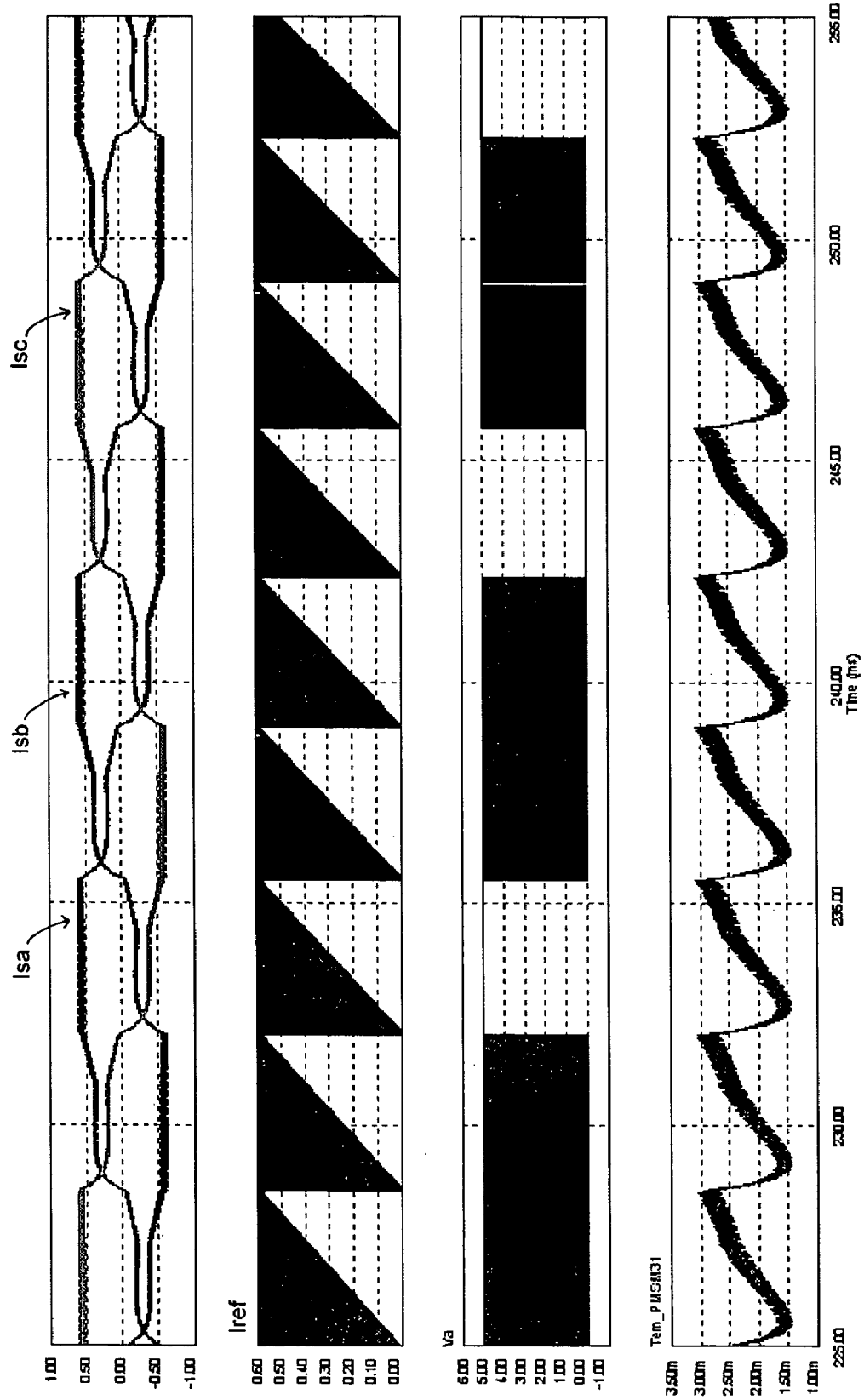
FIG. 15 shows the simulation results of current control performance with the Matsushita's approach.
Figure 16:
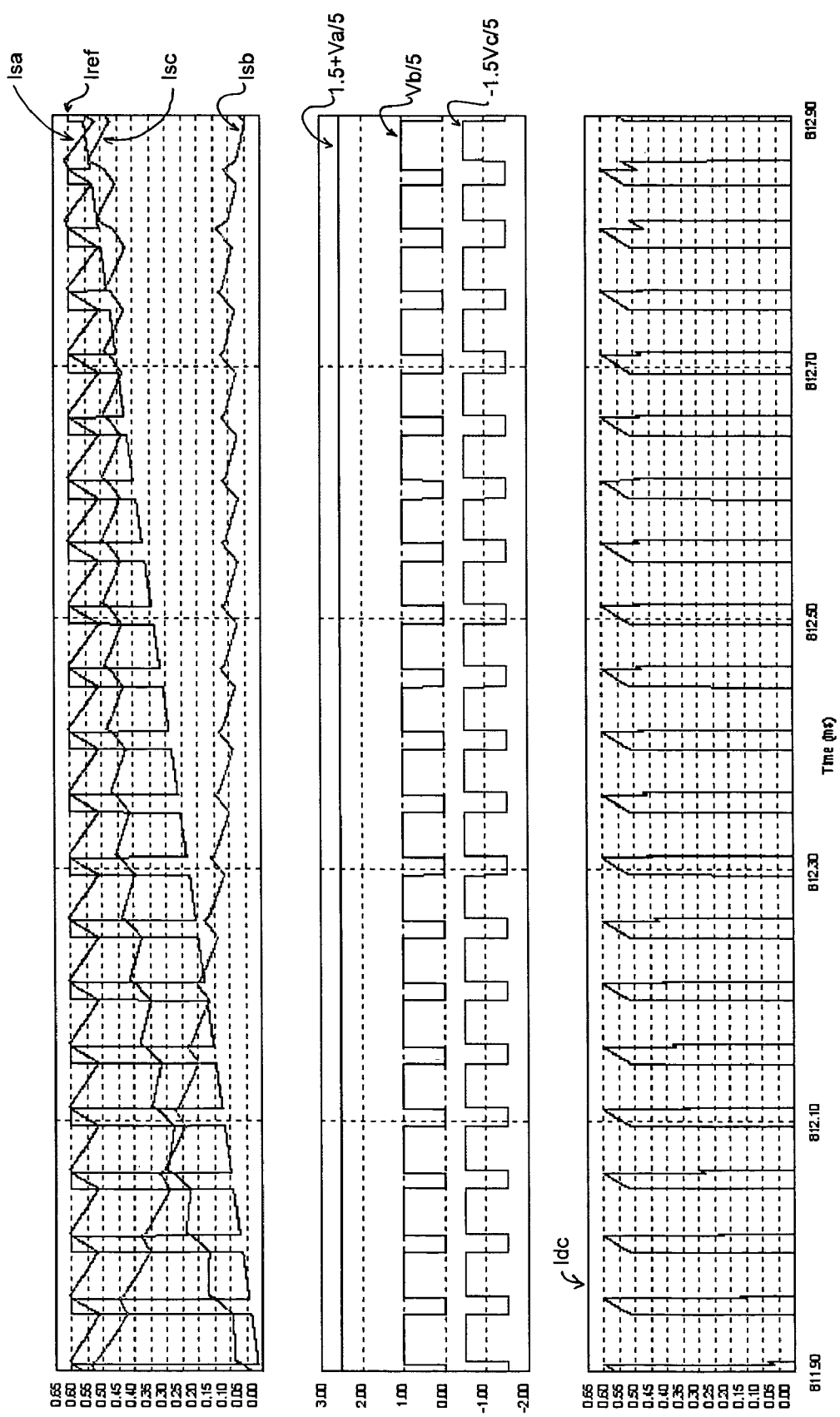
FIG. 16 shows the fundamental problem of Matsushita's approach with trapezoidal current waveforms.
Figure 17:
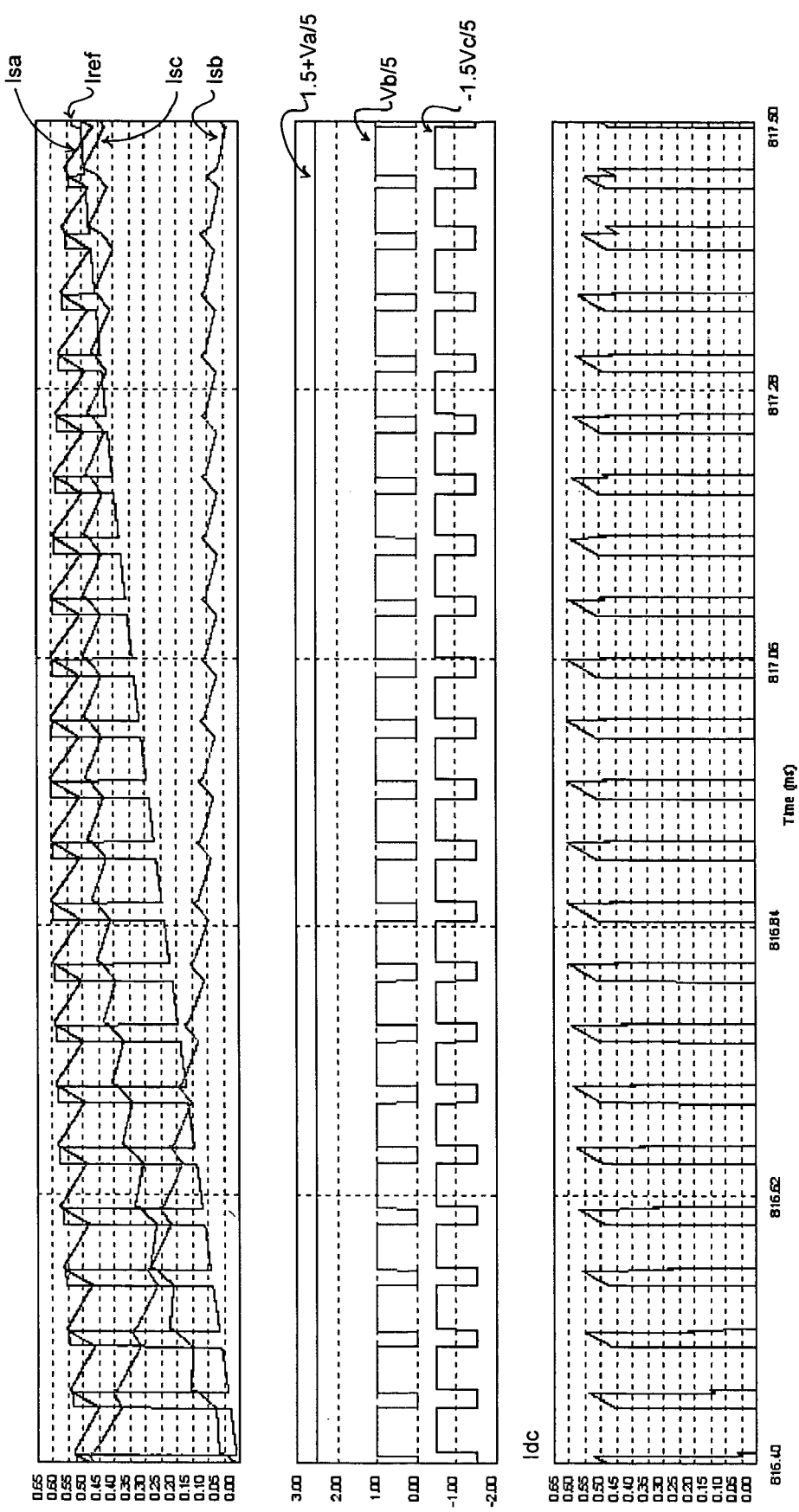
FIG. 17 shows the fundamental problem of Matsushita's approach with sinusoidal current waveforms.
Figure 18:
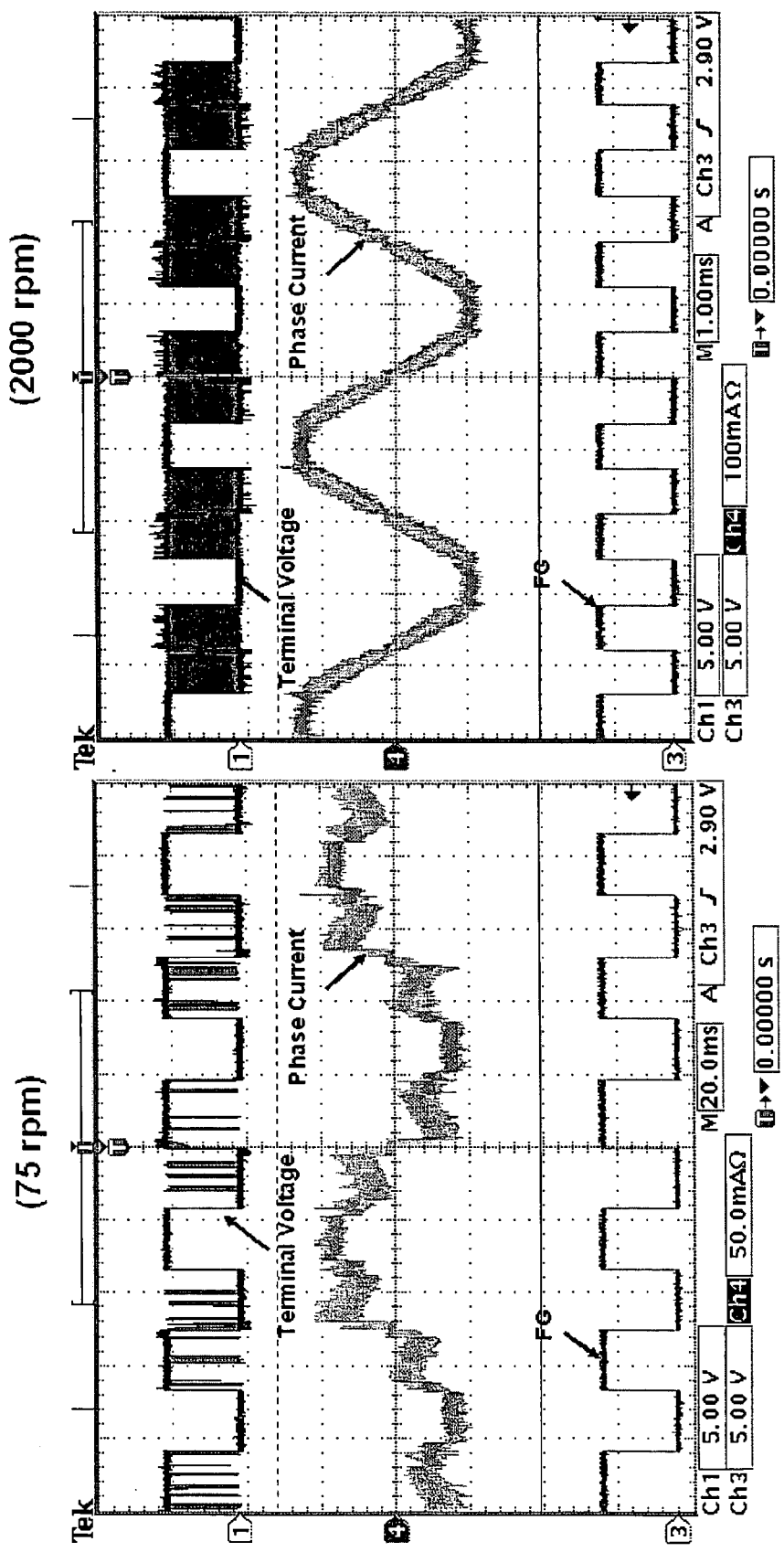
FIG. 18 show experimental results of Matsushita's approach at (a) low-speed operation, (b) high-speed operation.
Figure 19:
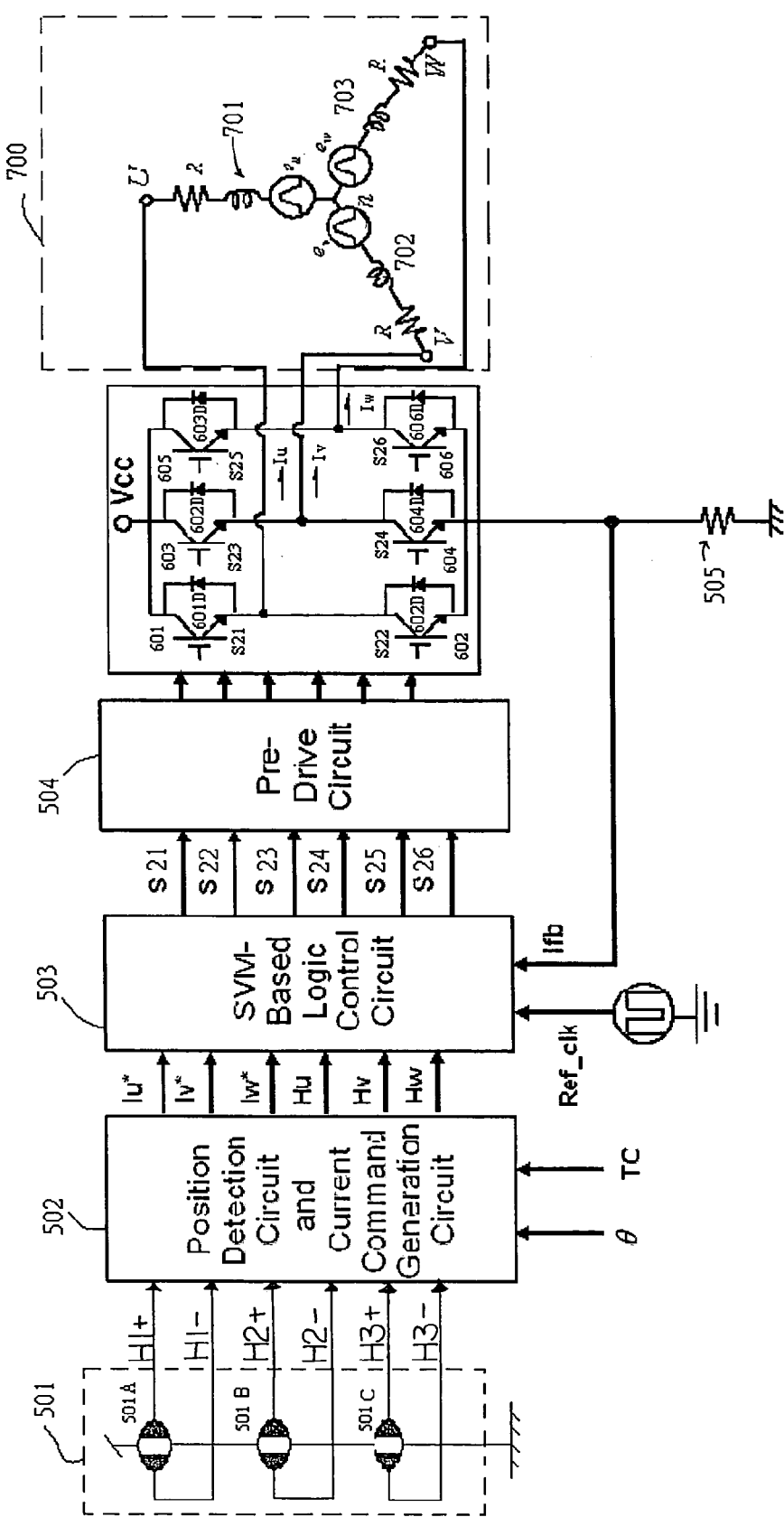
FIG. 19 is a block diagram of a motor driver according to a preferred embodiment of the present invention.

Referring to FIG. 19 of the drawings, FIG. 19 is a block diagram of a motor driver according to a preferred embodiment of the present invention in which the motor driver includes a Hall sensor circuit 501, a position detection circuit and current command generation circuit 502, a space vector modulation (SVM) based logic control circuit 503, a pre-drive circuit 504, a current detection resistor 505, and U-phase, V-phase, and W-phase upper side drive transistors 601, 603, and 605, U-phase, V-phase, and W-phase lower side drive transistors 602, 604, and 606, diodes 601D, 602D, 603D, 604D, 605D, and 606D. A motor includes a U-phase coil 701, a V-phase coil 702, and a W-phase coil 703.

In this embodiment N-type metal oxide semiconductor (NMOS) transistors are used as the drive transistors 601–606. The anode end and cathode end of the diode 601D are connected to the source terminal and drain terminal of the drive transistor 601 respectively. Likewise, the anode end and cathode end of the diode 602D–606D are connected to the source terminal and drain terminal of the drive transistors 602–606 respectively in the same manner. The drains terminal of the drive transistors 601, 603, and 605 are connected to the power supply Vcc, and the source terminals of the drive transistors 602, 604, and 606 are connected to one end of the current detection resistor 505. The other end of the current detection resistor 505 is grounded. The arm of the drive transistors 601–602 and the diodes 601D–602D operate as a U-phase output circuit, the arm of the drive transistors 603–604 and the diodes 603D–604D operate as a V-phase output circuit, and the arm of the drive transistors 605–606 and the diodes 605D–606D operate as a W-phase output circuit. The common node of the source terminal of the transistor 601 and the drain terminal of the transistor 602 is connected to one terminal of the U-phase coil 701. Likewise, the common node of the source terminal of the transistor 603 and the drain terminal of the transistor 604 is connected to one terminal of the V-phase coil 702, and the common node of the source terminal of the transistor 605 and the drain terminal of the transistor 606 is connected to one terminal of the W-phase coil 703. The other terminals of the U-phase coil 701, the V-phase coil 702, and the W-phase coil 703 are connected to one another.

The current flowing from the drive transistors 601–602 toward to the U-phase coil 701 is called a U-phase current $I_U$. Likewise, the current flowing from the drive transistors 603–604 toward to the V-phase coil 702 is called a V-phase current $I_V$, and the current flowing from the drive transistors 605–606 toward to the W-phase coil 703 is called a W-phase current $I_W$. The direction of all the phase currents $I_U$, $I_V$, and $I_W$ toward from the drive transistors 601–606 toward to the coils 701–703 is assumed as the positive direction for all the phase currents. The coils 701–703 of the motor 700 are in Y connection. Therefore, the respective phase currents are equal to currents flowing through the corresponding coils.

The Hall sensor circuit 501 includes Hall sensors 501A, 501B, and 501C, which detect the position of a rotor of the motor 700 and output the detection results to the position detection circuit and current command generation circuit 502 as Hall sensors 501A, 501B, and 501C output H1+, H1−, H2+, H2−, H3+, and H3−. The position detection circuit and current command generation circuit 502 determines the position signals $H_U$, $H_V$, and $H_W$ based on the Hall sensor outputs H1+, H1−, H2+, H2−, H3+, and H3−, and outputs the position signals $H_U$, $H_V$, and $H_W$ to the SVM based logic control circuit 503. The position signals $H_U$, $H_V$, and $H_W$ are digital signals. The position detection circuit and current command generation circuit 502 determines the U-phase current command signal $I_U{}^*$, the V-phase current command signal $I_V{}^*$, and the W-phase current command signal $I_W{}^*$ based on a torque command signal Tc, a desired phase shift angle θ, and the Hall sensor outputs H1+, H1−, H2+, H2−, H3+, and H3−. The position detection circuit and current command generation circuit 502 outputs the U-phase current command signal $I_U{}^*$, the V-phase current command signal $I_V{}^*$, and the W-phase current command signal $I_W{}^*$ to the SVM based logic control circuit 503. The SVM based logic control circuit 503, which receives the position signals Ha, Hb, and Hc, the U-phase current command signal $I_U{}^*$, the V-phase current command signal $I_V{}^*$, and the W-phase current command signal $I_W{}^*$ and a feedback current signal Ifb, generates switching control signals S21–S26 to select any of the drive transistors 601–606 to be turned on or off, and sends instructions to the pre-drive circuit 504. The pre-drive circuit 504 outputs signals to the gates of the drive transistors 601–606 according to the outputs of the SVM based logic control circuit 503 in order to control ON/OFF of the drive transistors 601–606.

Figure 20A:
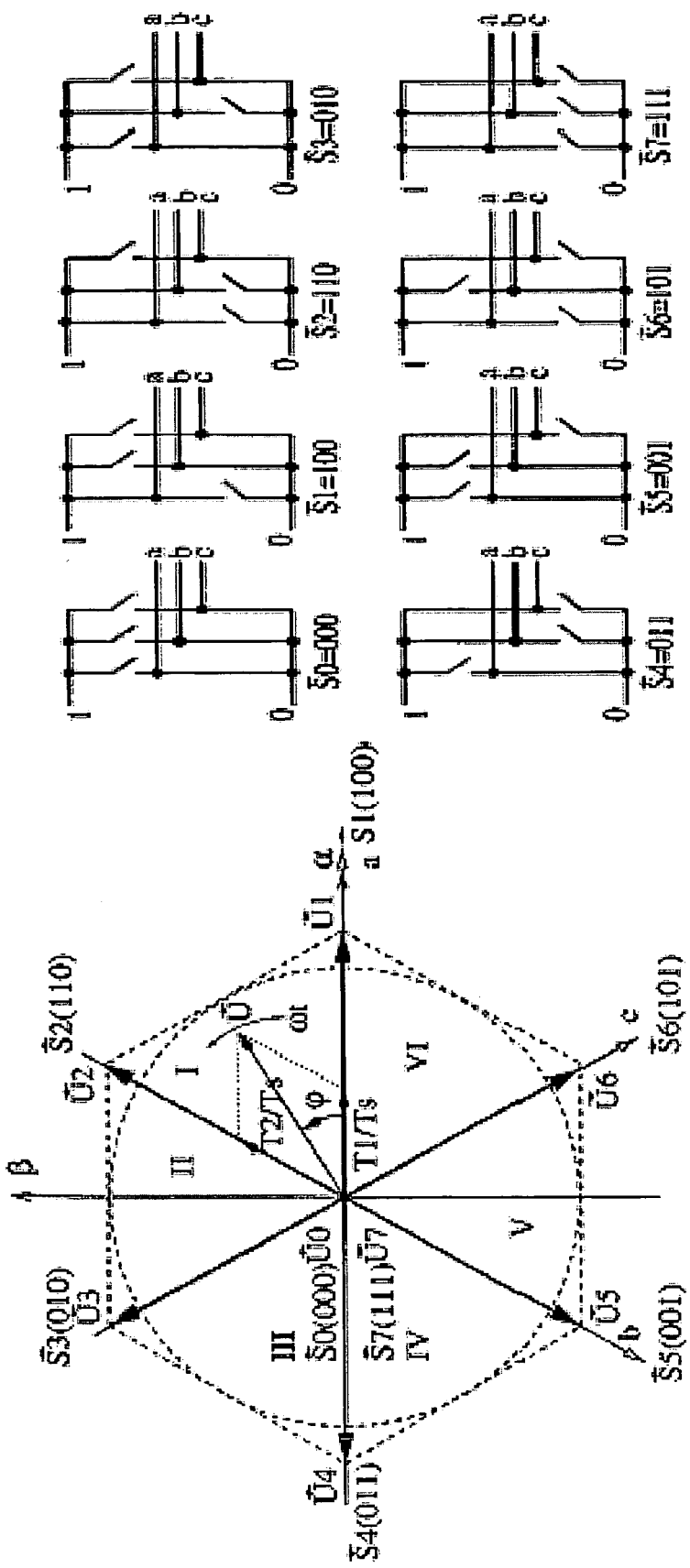
FIG. 20(a) shows the definition of the space vectors and the switch state patterns.
Figure 20B:
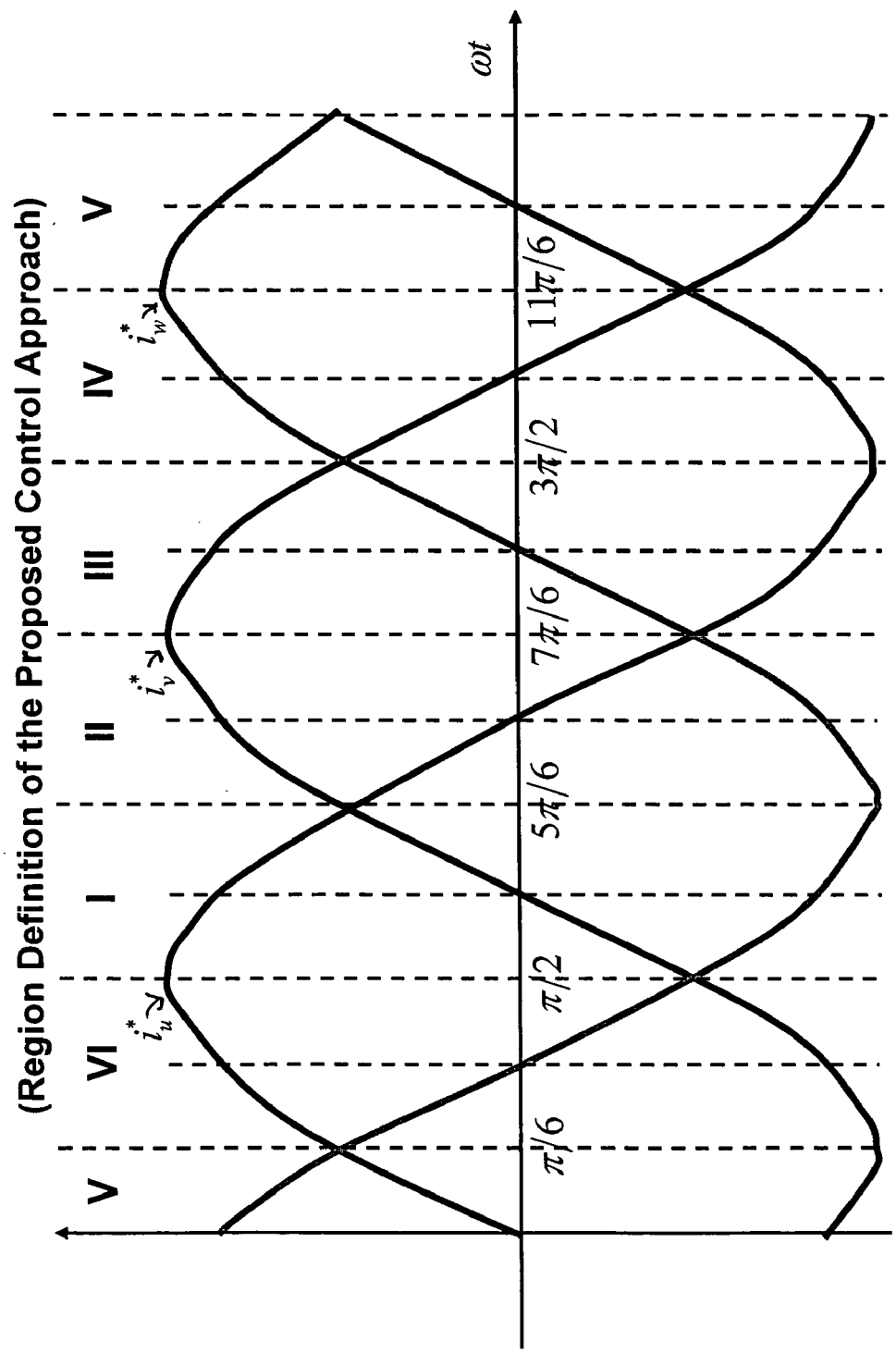
FIG. 20(b) is a target waveform for respective phase currents according to a preferred embodiment of the present invention.

Referring to FIG. 20(a)–20(b) of the drawings, FIG. 20(a) shows the definition of the space vectors and the switch state patterns, and FIG. 20(b) is a target waveform for respective phase currents according to a preferred embodiment of the present invention. Space vector modulation treats the drive transistors 601–606 of FIG. 19 as a unit which can be driven to eight unique states that each creates a respective voltage vector. These states are shown in FIG. 20(a) in which vectors are expressed in terms of a 1 which indicates the an upper side drive transistor (e.g. upper side drive transistors 601, 603, or 605 in FIG. 19) is turned on and a 0 which indicates that a lower side drive transistor (e.g. upper side drive transistors 602, 604, or 606 in FIG. 19) is turned on. In FIG. 20(a) a transistor off condition is indicated by a short line that extends from either an upper supply voltage or a lower supply voltage. In contrast, a transistor on condition is indicated by a longer line that extends down and to the right (i.e., towards the stator windings). Voltage vector V0, for example, shorts the stator windings because it turns on all of the lower side drive transistors. Voltage vector V7, also shorts the stator windings by turning on all of the upper side drive transistors. Accordingly, voltage vectors V0 and V7 are called null or zero vectors because they correspond to zero voltages in the stator windings.

Voltage vector V1 couples a current through an upper side drive transistor to its respective stator winding and then splits that current through the other two stator windings and their respective lower side drive transistors. Voltage vector V2 passes currents from two upper side transistors through their respective stator windings and then combines these currents into a current through the remaining stator winding and its respective lower side transistor. From these examples, the switch states of other voltage vectors are apparent from an examination of FIG. 20(a).

FIG. 20(a) illustrates eight switch states and voltage vectors that represent these states. In addition, FIG. 20(b) shows the regions which are defined for the sinusoidal current commands according to these space vectors of the present invention. In FIG. 20(b), these voltage vectors are mapped onto the α-β axes of a state map. The null vectors V0 and V7 are positioned at the coordinate center, the voltage vector V1 lies along the α-axis and voltage vectors V2–V6 are successively spaced 60° from the voltage vector V1. Therefore, the α-β axes of the state map can be divided into six regions I–VI. It should be noted the region definitions of the present invention and the Matsushita's approach shown in U.S. Pat. No. 6,674,258 and U.S. Pub. 2004/0000884 are different as indicated in FIG. 20(b). This region difference is helpful for improving the weakness of the shape-tracking ability of the Matsushita's approach as discussed in the previous section.

Figure 21:
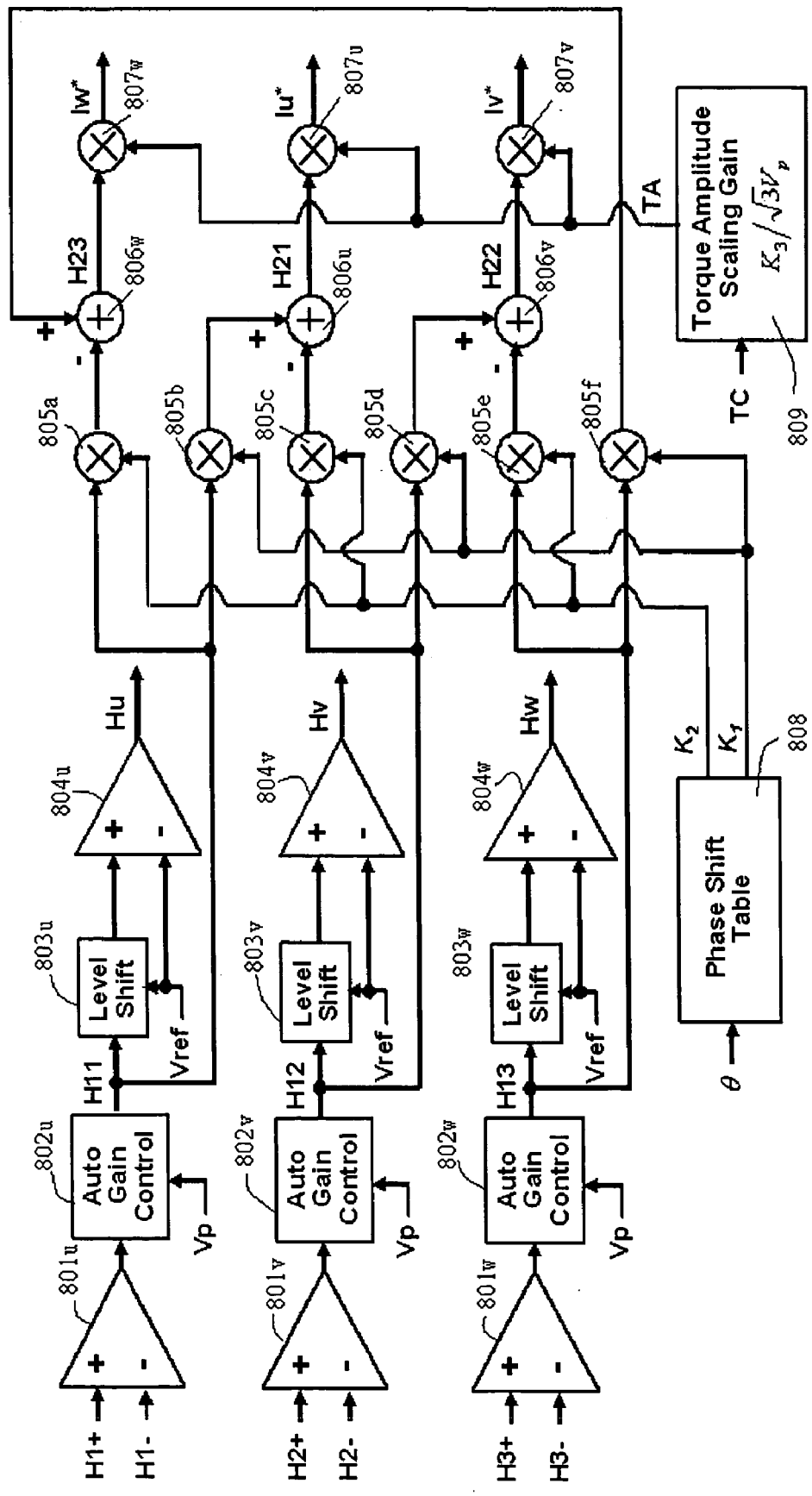
FIG. 21 shows the schematic diagram of the position detection circuit and current command generation circuit according to a preferred embodiment of the present invention.

Referring to FIG. 21 of the drawings, FIG. 21 shows the schematic diagram of the position detection circuit and current command generation circuit according to a preferred embodiment of the present invention. The position detection circuit includes differential amplifiers 801U, 801V, and 801W, auto gain control circuits 802U, 802V, and 802W, level shift circuits 803U, 803V, and 803W, comparators 804U, 804V, and 804W. The position detection circuit determines the position signals $H_U$, $H_V$, and $H_W$ indicating the position of the rotor of the motor 700 based on the Hall sensor outputs H1+, H1−, H2+, H2−, H3+, and H3−. The output of the differential amplifier 801U represents the difference between the Hall sensor outputs H1+, and H1−. Likewise, the output of the differential amplifier 801V represents the difference between the Hall sensor outputs H2+, and H2−. The output of the differential amplifier 801W represents the difference between the Hall sensor outputs H3+, and H3−. The auto gain control circuits 802U, 802V, and 802W, which receive the outputs of the differential amplifiers 801U, 801V, and 801W, adjust the outputs of the differential amplifiers to have the same peak value. Accordingly, the outputs H11, H12, and H13 of the auto gain control circuits 802U, 802V, and 802W have the same amplitude. The signals H11, H12, and H13 are approximate sinusoidal waves because the Hall sensor outputs H1+, H1−, H2+, H2−, H3+, and H3− are approximate sinusoidal waves. The phase of the signal H11 is ahead of that of the signal H12 by 120°. Likewise, the phase of the signal H12 is ahead of that of the signal H13 by 120°.

The level shift circuits 803U, 803V, and 803, which are used to shift a voltage level of the outputs H11, H12, and H13 of the auto gain control circuits 802U, 802V, and 802W, output the results to the comparators 804U, 804V, and 804W respectively. The comparators 804U, 804V, and 804W compare the outputs of the level shift circuits 803U, 803V, and 803 with a voltage reference Vref, and generate position signals $H_U$, $H_V$, and $H_W$ respectively.

Figure 22:
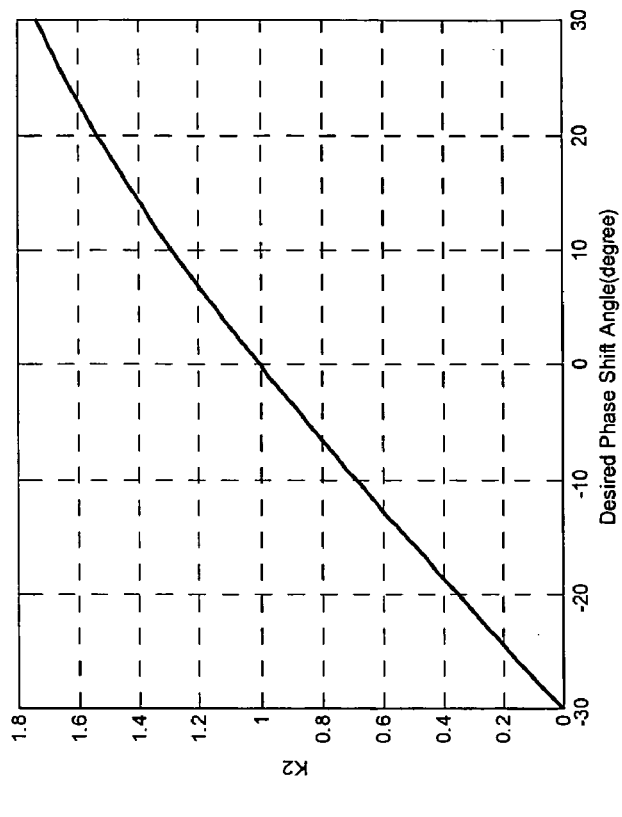
FIG. 22 shows the phase shift table.
Figure 22:
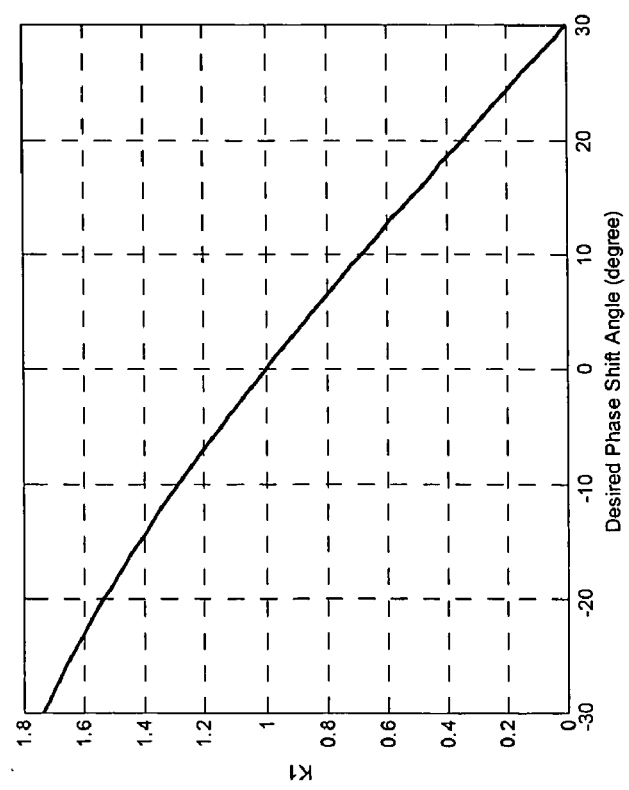
Figure 23:
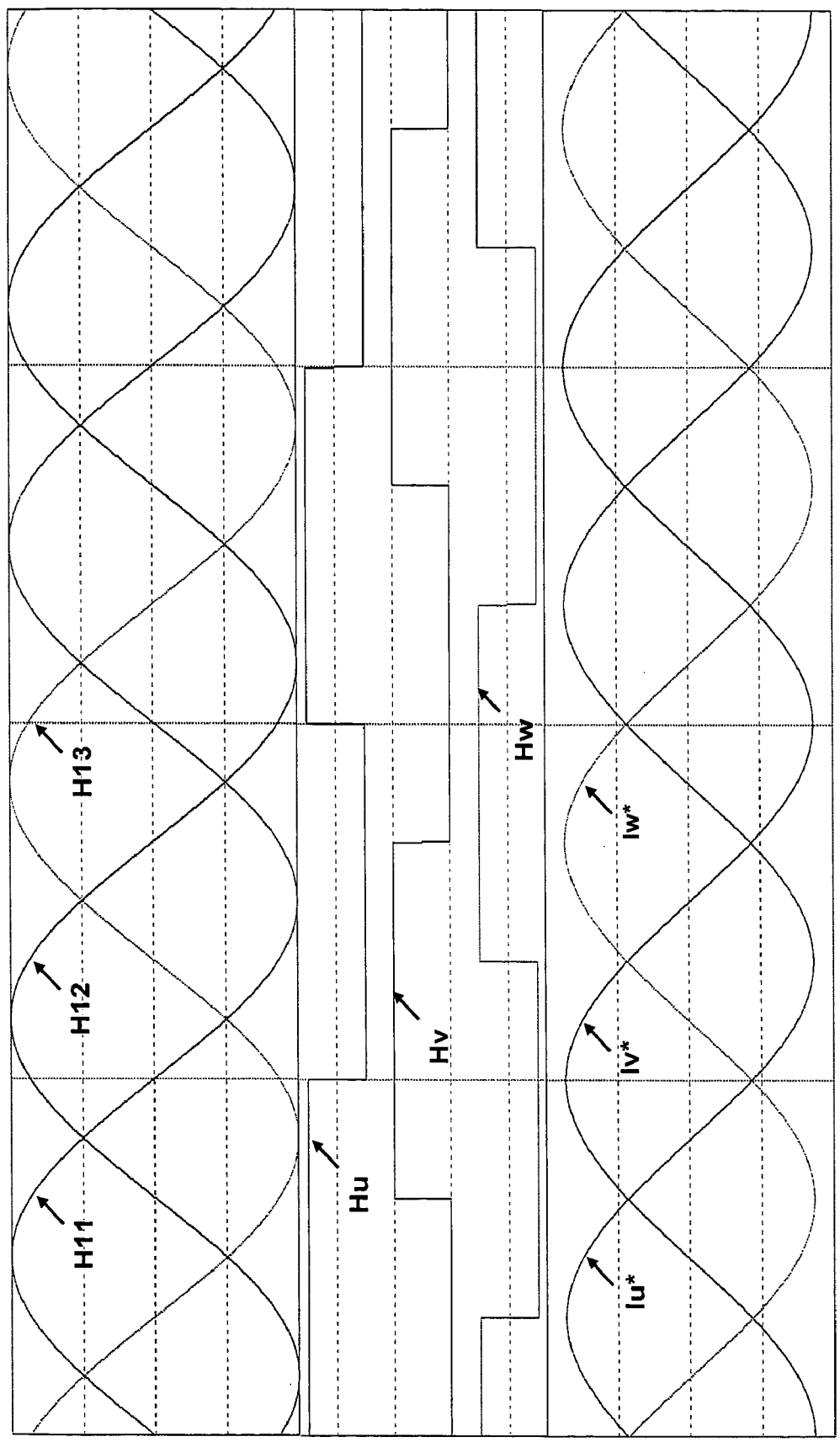
FIG. 23 shows the waveforms of the outputs of the position detection and current command generation circuits according to a preferred embodiment of the present invention.

The current command generation circuit includes multipliers 805a–805f, adders 806U, 806V, and 806W, multipliers 807U, 807V, and 807W, a phase shift table 808, and a torque amplitude scaling gain control circuit 809. The phase shift table 808 determines the value of $K_1$ and $K_2$ based on the desired phase shift angle θ. The position detection signal H21 is from $K_1{}^*H11-K_2{}^*H12$. Likewise, the position detection signal H22 is from $K_1{}^*H12-K_2{}^*H13$. The position detection signal H23 is from $K_1{}^*H13-K_2{}^*$ H11. Assume that $K_1=K_2=1$. Accordingly, the phase of the position detection signal H21 is ahead of that of the signal H11 by 30°. In other words, the phase of the position detection signal H21 ahead of that of the signal H11 is determined by the value of $K_1$, and $K_2$, i.e. the desired phase shift angle θ. Likewise, the phase of the position detection signal H22 ahead of that of the signal H12 is determined by the value of $K_1$, and $K_2$, i.e. the desired phase shift angle θ. The phase of the position detection signal H23 ahead of that of the signal H13 is determined by the value of $K_1$, and $K_2$, i.e. the desired phase shift angle θ. The U-phase current command signal $I_U$* is determined by the signal H21 and the torque command signal TC. The value of the torque command signal TC is adjusted by the torque amplitude scaling gain control circuit 809. Likewise, the V-phase current command signal $I_V$*, and the W-phase current command signal $I_W$* are determined by the signals H22, and H23, and the torque command signal TC. Accordingly, the U-phase current command signal $I_U$*, the V-phase current command signal $I_V$* and the W-phase current command signal $I_W$*, based on a torque command signal Tc, a desired phase shift angle θ, and the Hall sensor outputs H1+, H1−, H2+, H2−, H3+, and H3−. The phase shift table 808 is shown FIG. 22. FIG. 23 shows the waveforms of the outputs of the position detection and current command generation circuits according to a preferred embodiment of the present invention.

Figure 24:
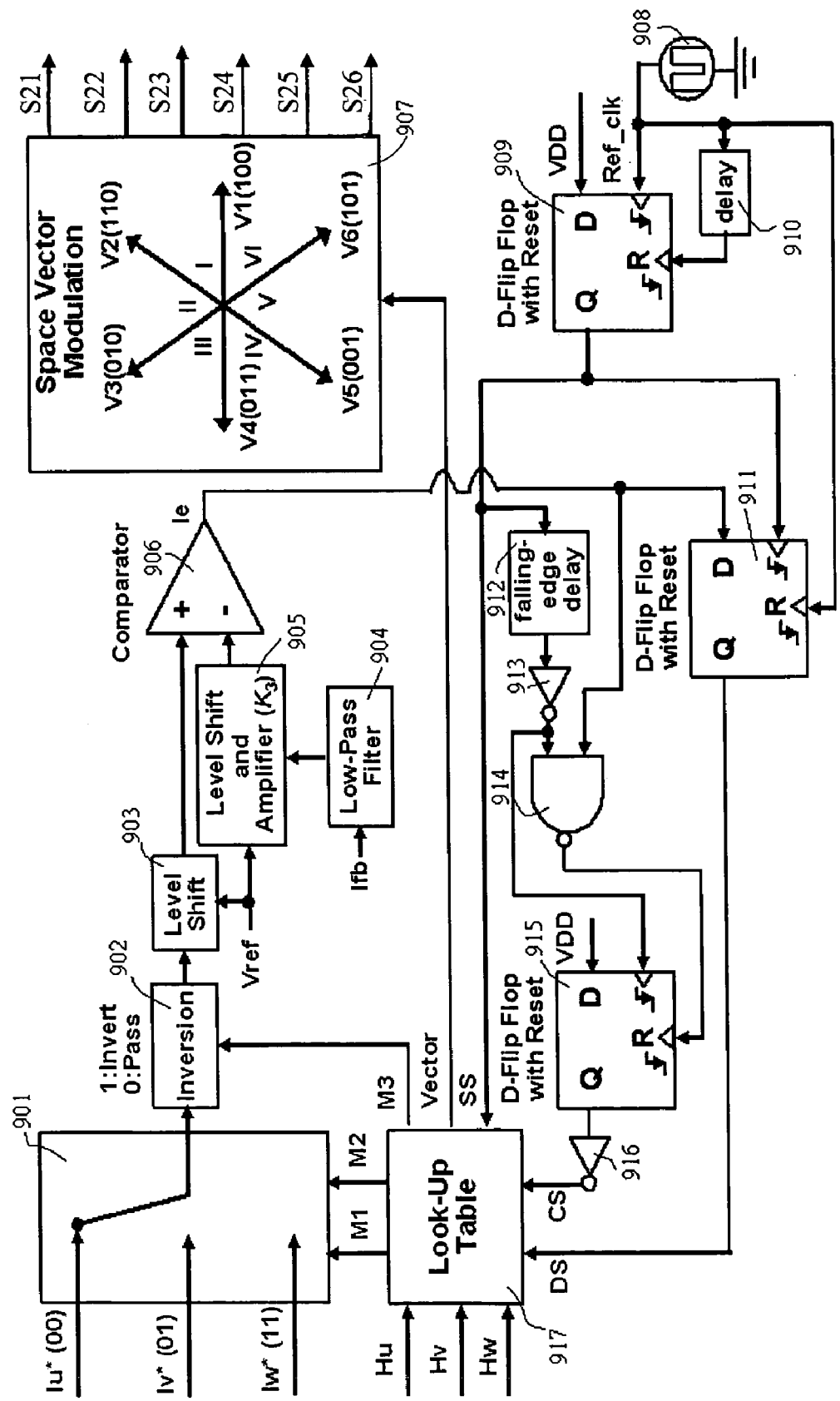
FIG. 24 shows the schematic diagram of the SVM based logic control circuit according to a preferred embodiment of the present invention.
Figure 25:
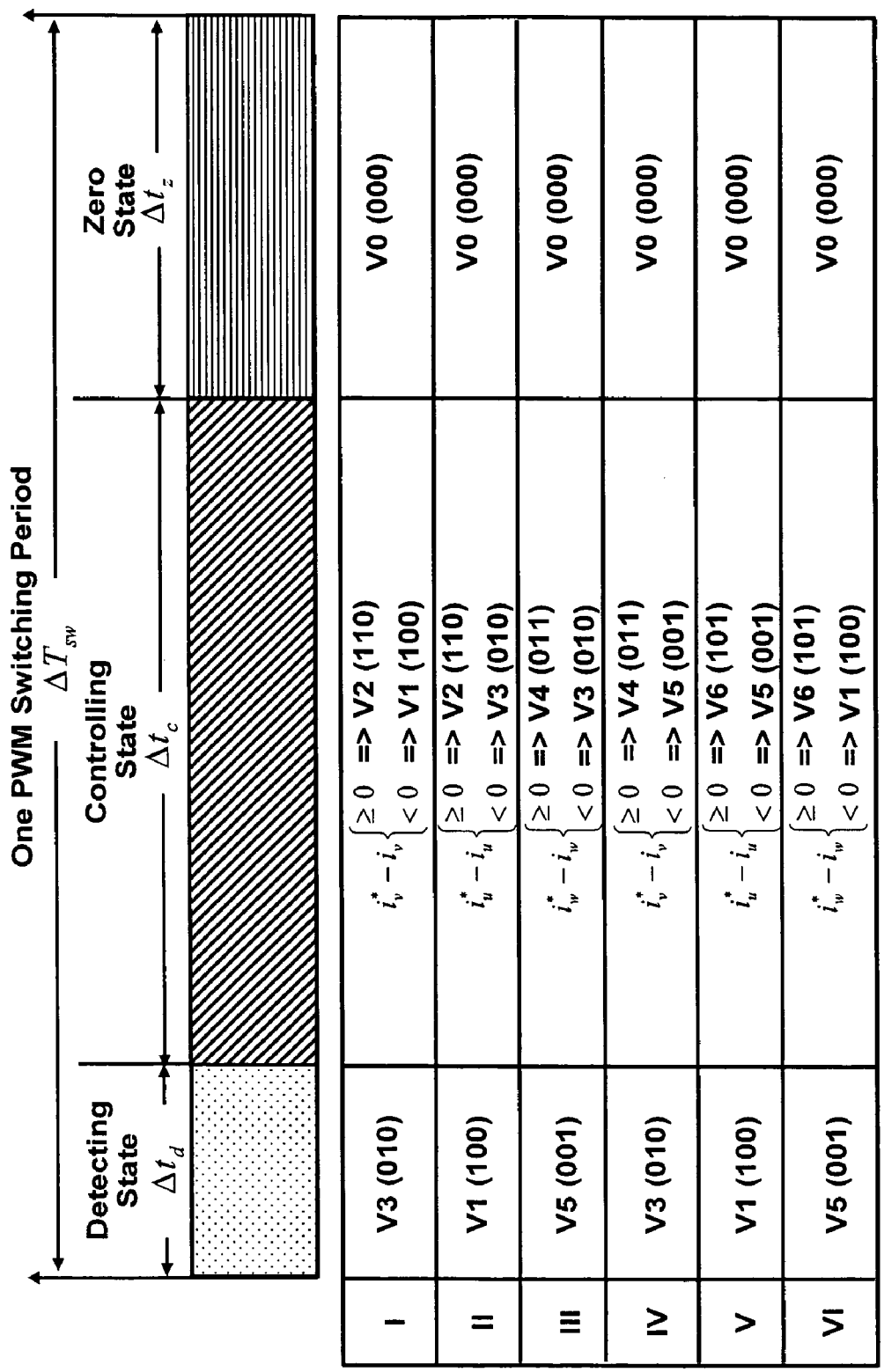
FIG. 25 shows the timing diagram of the SVM based logic control circuit according to a first preferred embodiment of the present invention.

Referring to FIGS. 24–26 of the drawings, FIG. 24 shows the schematic diagram of the SVM based logic control circuit according to a preferred embodiment of the present invention. FIG. 25 shows the timing diagram of the SVM based logic control circuit according to a first preferred embodiment of the present invention. FIG. 26 shows the look-up table of the SVM based logic control circuit according to a first preferred embodiment of the present invention. The SVM based logic control circuit 503 includes a multiplexer 901, a inversion circuit 902, a level shift circuit 903, a low pass filter 904, a level shift and amplifier 905, a comparator 906, a space vector modulation 907, a reference clock generator 908, D-Flip flops 909, and 911, a delay 910, a falling-edge delay 912, inverters 913, and 916, NAND Gate 914, and a look-up table 917. The look-up table 917 determines the conduction state of the multiplexer 901 and the output of the space vector modulation 907 based on the position signals $H_U$, $H_V$, and $H_W$, the detecting state signal DS, the controlling state signal CS, and the state signal SS. The look-up table 917 also determines the state of the inversion circuit 902. For example, assume that SS=0, DS=1, CS=0, $H_U$=1, $H_V$=0, and $H_W$=0. Accordingly, M1=0, M2=1, M3=0, and Voltage Vector=V3. The V-phase current command signal $I_V$* is transmitted to the inversion circuit 902 through the multiplexer 901 and bypasses the inversion circuit 902 owing to M3=0. The voltage vector V3 is sent to the space vector modulation 907. The space vector modulation 907 generates switching control signals S21–S26 to select any of the drive transistors 601–606 to be turned on or off, and sends instructions to the pre-drive circuit 504. The pre-drive circuit 504 outputs signals to the gates of the drive transistors 601–606 according to the outputs of the SVM based logic control circuit 503 in order to control ON/OFF of the drive transistors 601–606.

Figure 27:
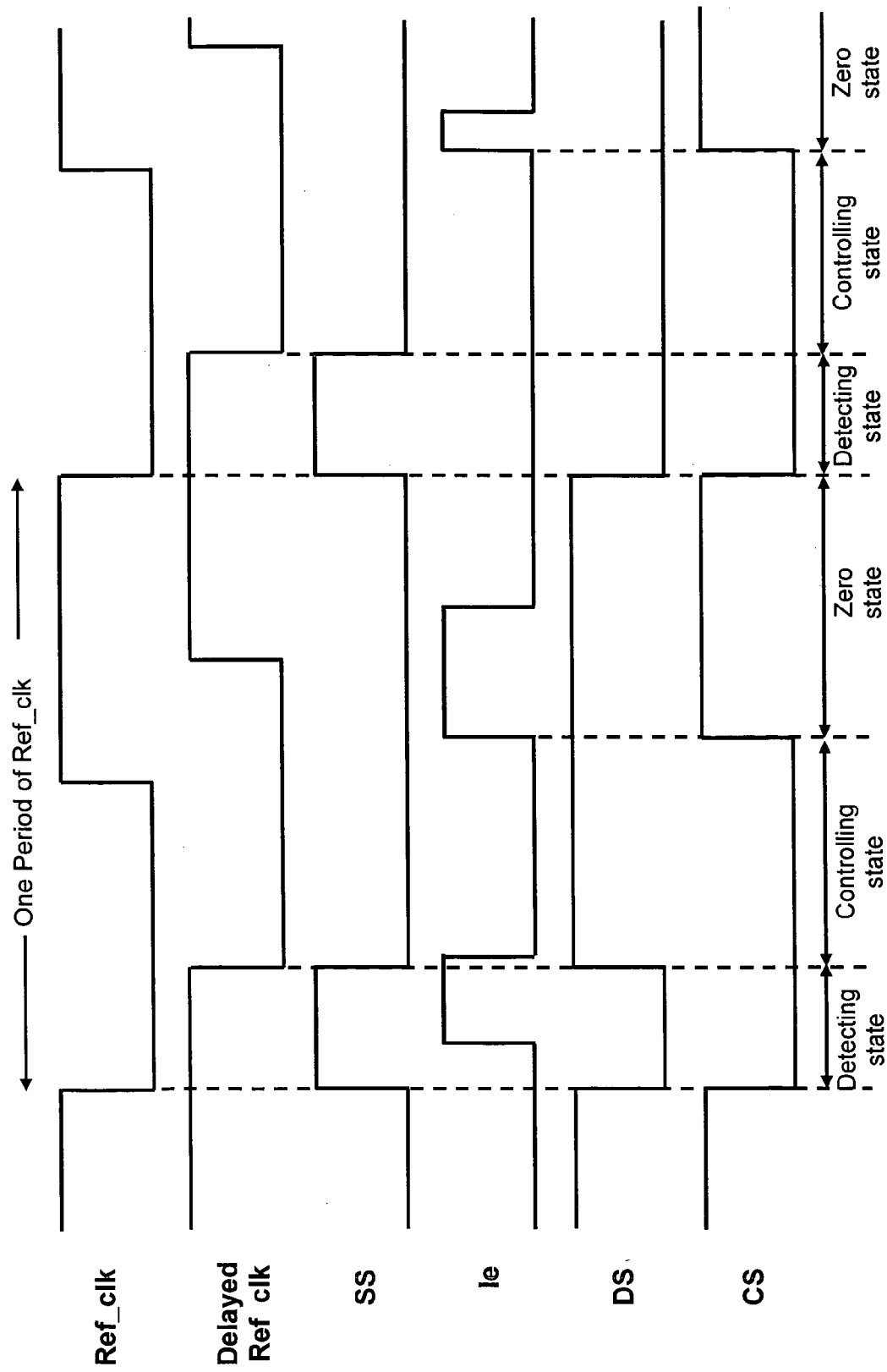
FIG. 27 is the SVM based logic control waveform according to a first preferred embodiment of the present invention.
Figure 28:
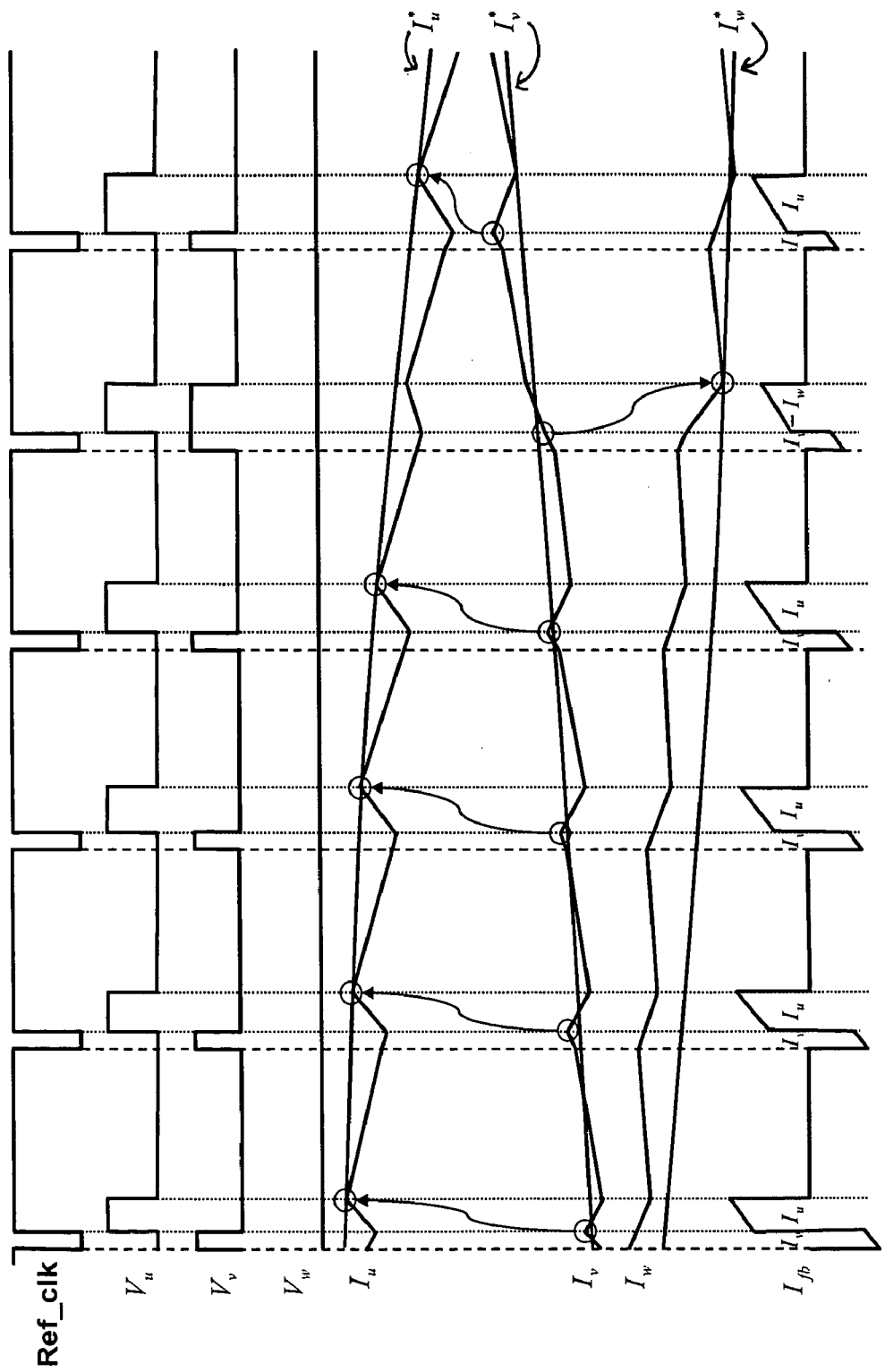
FIG. 28 illustrates the current control waveforms of the SVM based logic control circuit in Region I according to a first preferred embodiment of the present invention.
Figure 29:
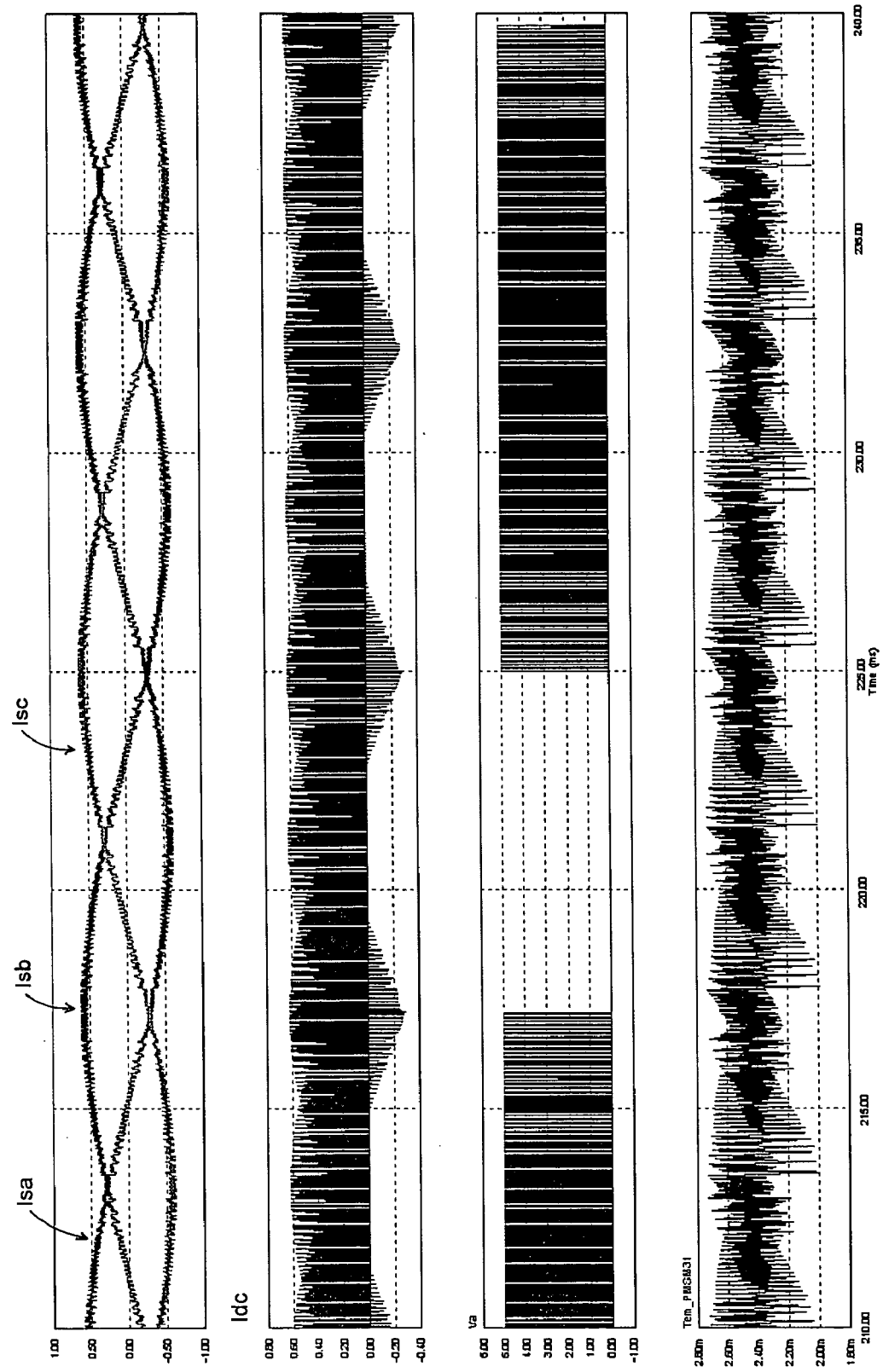
FIG. 29 illustrates the simulation results according to a preferred embodiment of the present invention.
Figure 30:
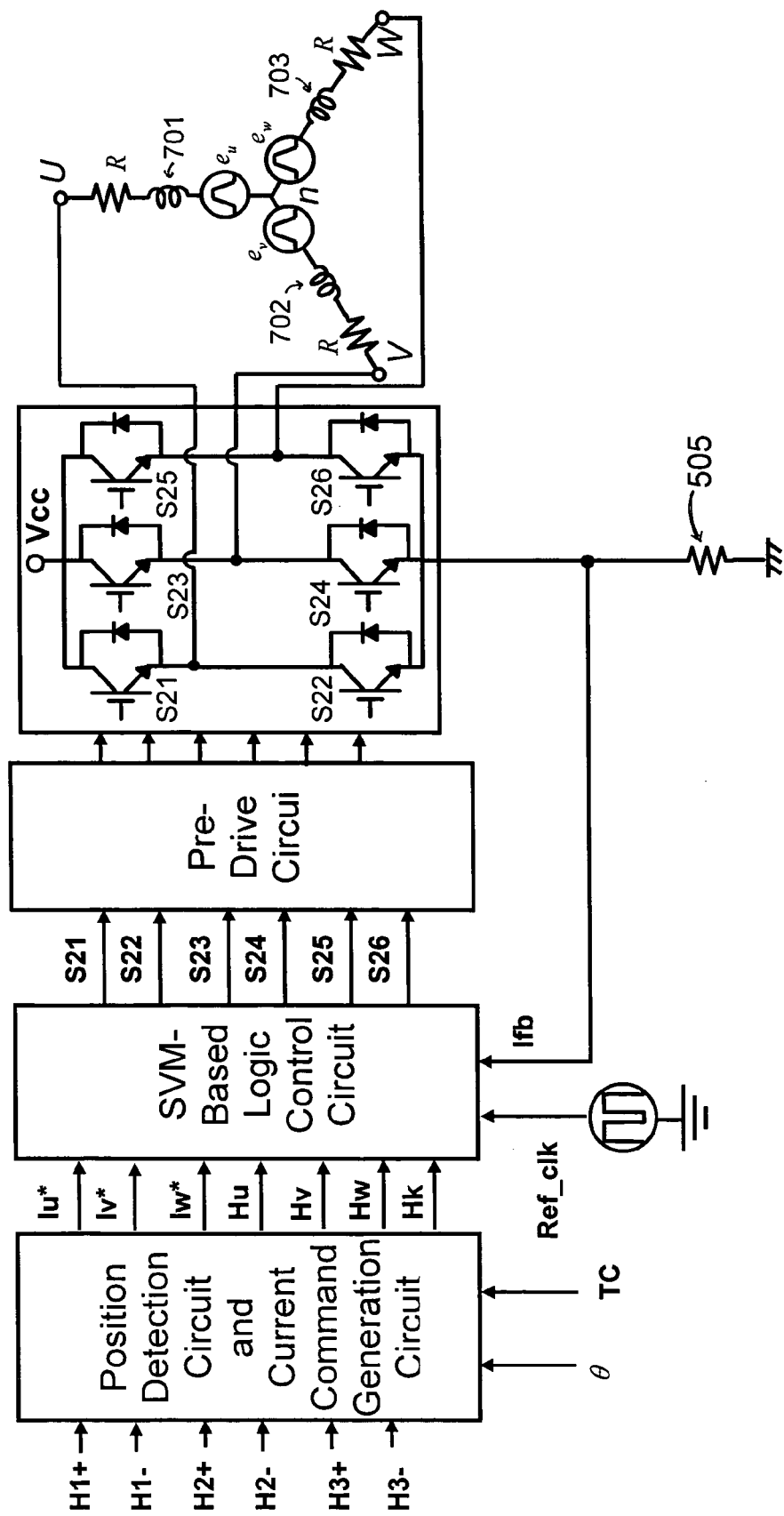
Figure 31:
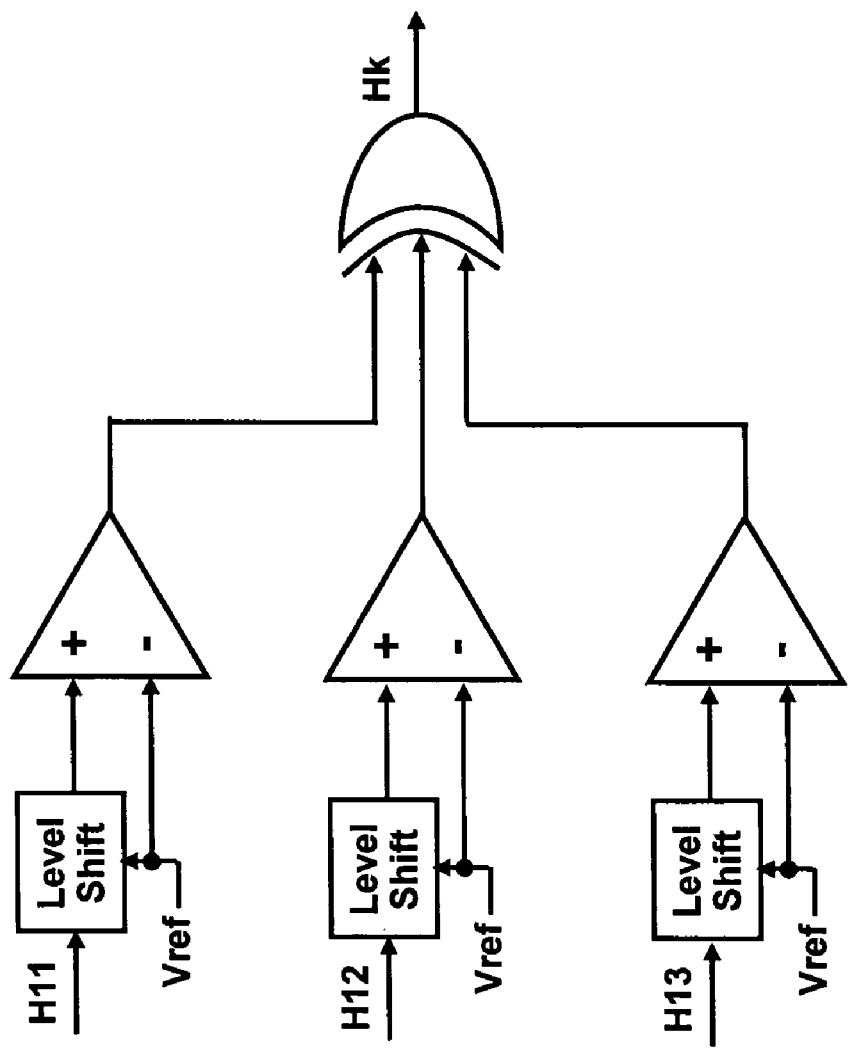
Figure 32:
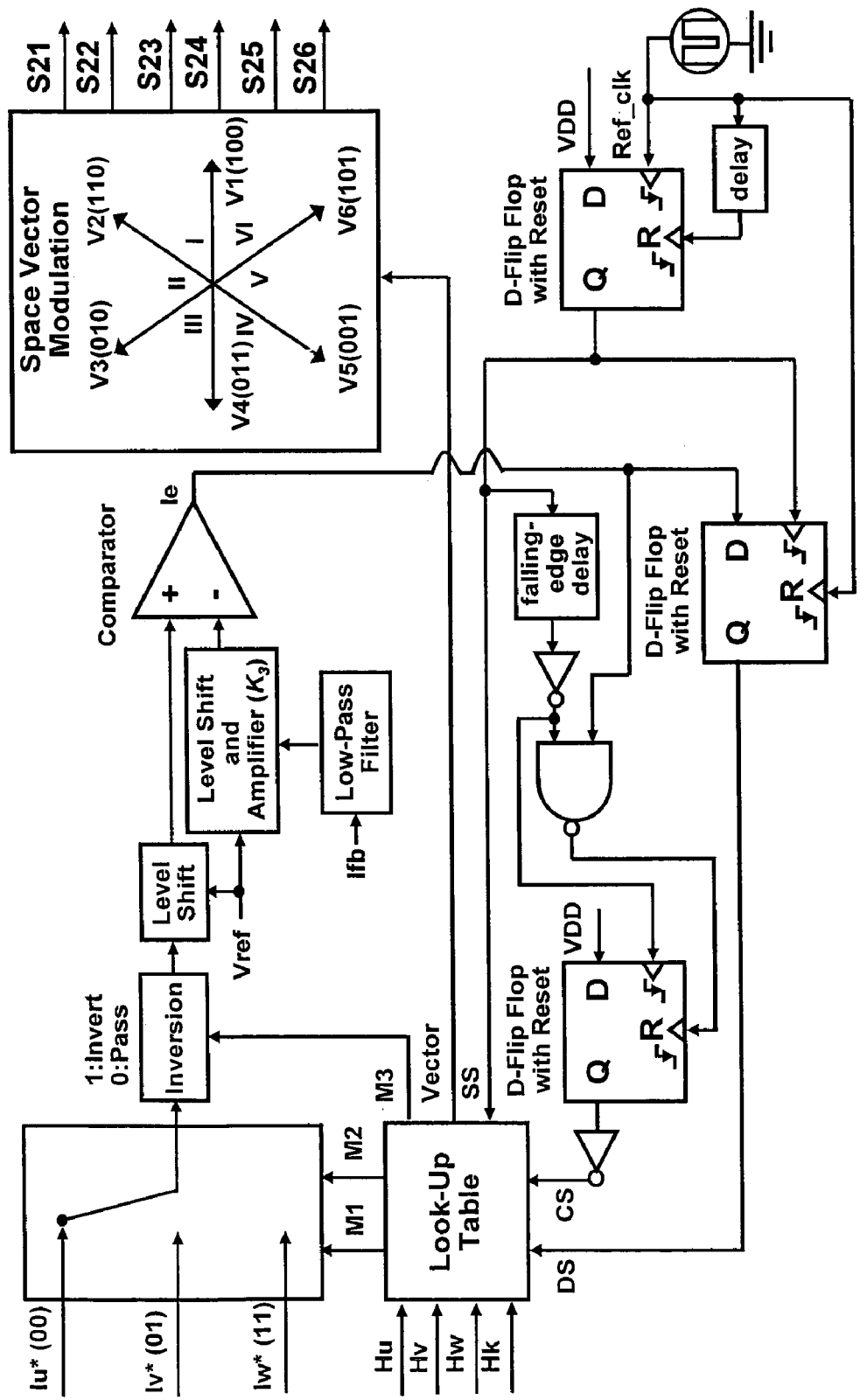
Figure 33:
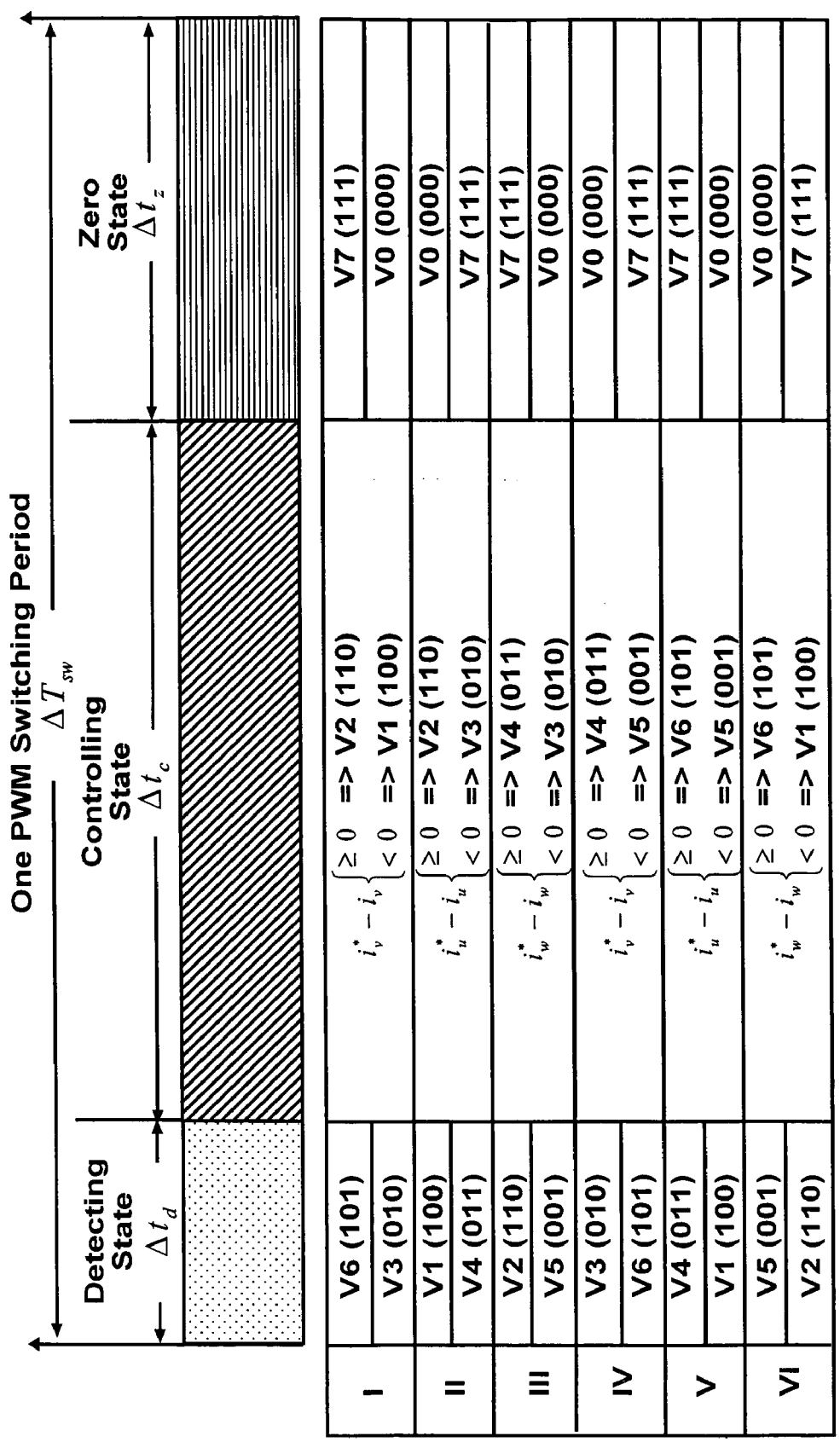

Referring to FIG. 25, FIG. 25 shows the timing diagram of one PWM switching period of the SVM based logic control circuit according to a preferred embodiment of the present invention. The present invention is to divide one PWM switching period into three states: a detecting state, a controlling state, and a zero state as shown in FIG. 25. In the detecting state, a testing voltage vector is applied for a small time interval $\Delta t_d$ for detecting the critical phase current error in different regions. According to the detected phase current error, a suitable voltage vector is selected for controlling the corresponding phase current. For example, when the desired output voltage vector is in Region I under the detecting state $\Delta t_d$, the voltage vector V3 is sent to the space vector modulation 907 to generate switching control signals S21–S26 to select any of the drive transistors 601–606 to be turned on or off. When the SVM based logic control circuit 503 receives the feedback current signal Ifb under the controlling state $\Delta t_c$, i.e. Ifb=$i_v$, the voltage vector V2 is sent to the space vector modulation 907 to generate switching control signals S21–S26 to select any of the drive transistors 601–606 to be turned on or off if the V-phase current command signal $I_V$* is larger than or equal to the feedback current signal Ifb or the voltage vector V1 is sent to the space vector modulation 907 to generate switching control signals S21–S26 to select any of the drive transistors 601–606 to be turned on or off if the V-phase current command signal $I_V$* is smaller than the feedback current signal Ifb. Once the U-phase current command signal $I_U$* equals to the feedback current signal Ifb when the V-phase current command signal $I_V$* is smaller than the feedback current signal Ifb, the SVM based logic control circuit 503 enters the zero state, i.e. the voltage vector V0 is sent to the space vector modulation 907 to generate switching control signals S21–S26 to turned off any of the drive transistors 601–606. Likewise, once the W-phase current command signal $I_W$* equals to the feedback current signal Ifb when the V-phase current command signal $I_V$* is larger than or equal to the feedback current signal Ifb, the SVM based logic control circuit 503 enters the zero state, i.e. the V0 is sent to the space vector modulation 907 to generate switching control signals S21–S26 to turned off any of the drive transistors 601–606. Please refer to FIG. 27 which is the SVM based logic control waveform according to a first preferred embodiment of the present invention. The error signal Ie is the output of the comparator 906 which compares the phase current command signal and the feedback current signal Ifb. The feedback current signal Ifb is a dc-link current which is fed back with a shunt resistor 505. Therefore, according to the above description, the sensed phase current from the dc-link current depends on the applied space vector, the current command must be multiplexed based on the space vector, and the sign of the feedback current must be determined for calculating the current error. FIG. 28 illustrates the current control waveforms of the SVM based logic control circuit in Region I according to a first preferred embodiment of the present invention. FIG. 29 illustrates the simulation results according to a preferred embodiment of the present invention.

Figure 35:
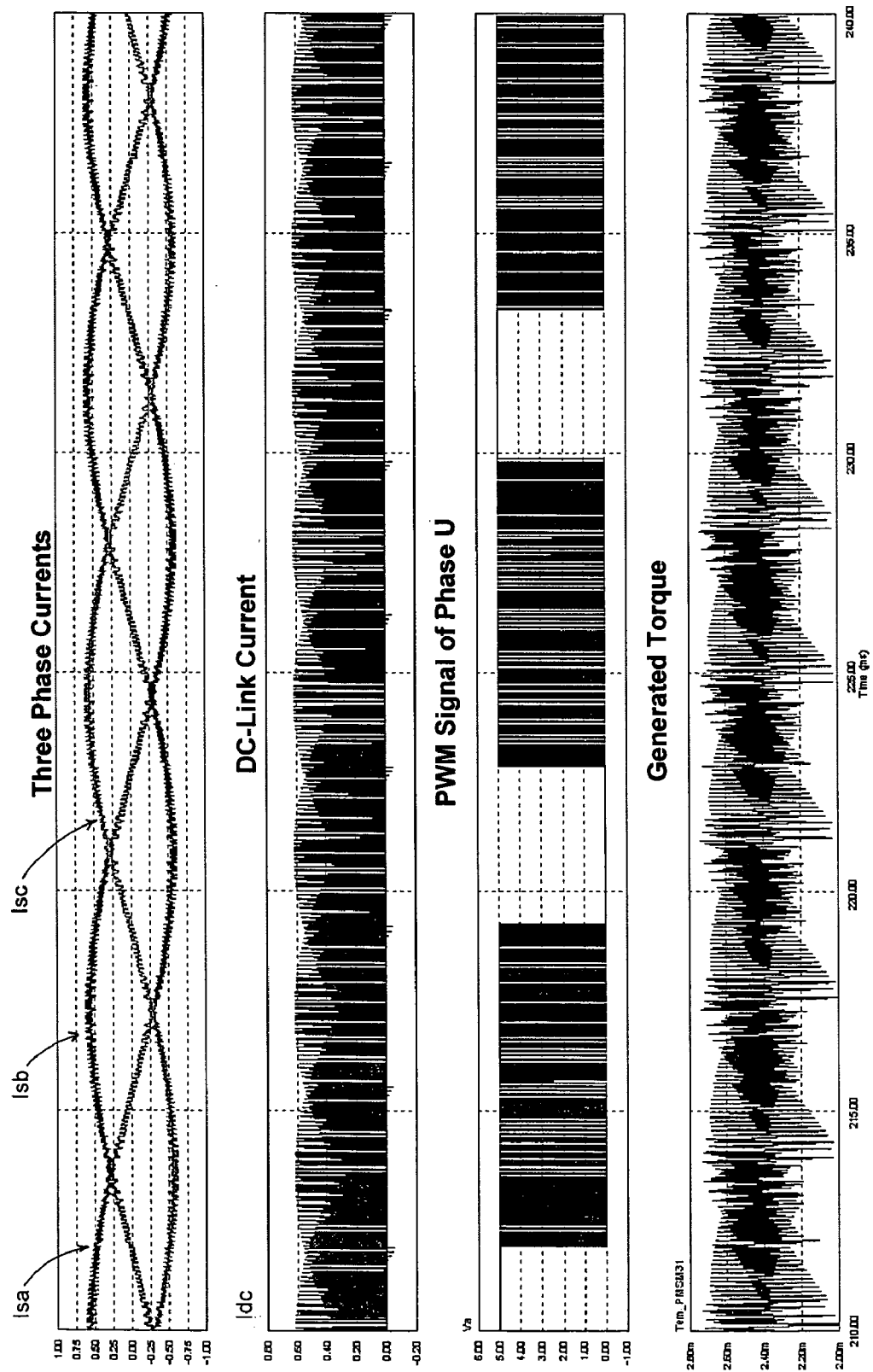

FIGS. 30–34 illustrate an alternative mode of the above preferred embodiment of the present invention. The only one difference is that the look-up table determines the conduction state of the multiplexer and the output of the space vector modulation based on not only the position signals $H_U$, $H_V$, and $H_W$, the detecting state signal DS, the controlling state signal CS, and the state signal SS but also a signal Hk. The XOR gate receives the position detection signals H21, H22, and H23 and outputs the signal Hk. Accordingly, the present invention divide the detecting state into 12 states as shown in FIG. 34. FIG. 35 illustrates the simulation results of the alternative mode of the above preferred embodiment of the present invention.

In addition, only one hysteresis comparator is required because only the dc-link current is fed back with a shunt resistor 505 in this present invention. According to the detected phase current error, a suitable space vector is selected for controlling the corresponding phase current with the hysteresis comparator. Therefore, the appropriate vector can be selected to control one phase current with a predefined hysteresis band within one PWM switching period.

One skilled in the art will understand that the embodiment of the present invention as shown in the drawings and described above is exemplary only and not intended to be limiting.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Additionally, the abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

What is claimed is:

1. A motor driver, comprising:
   a plurality of output circuits each having an upper side switch and a lower side switch connected in series for supplying a current to a motor from a connection point between said upper side switch and said lower side switch of each output circuit;
   a current detection resistor connected in series with said plurality of output circuits in common for detecting a current supplied to said plurality of output circuits;
   a position detection circuit for outputting position signals corresponding to a position of a rotor of said motor;
   a current command generation circuit for generating target current command signals based on said position signals and a predetermined phase angle in which a phase angle of said target current command signal is determined by said predetermined phase angle; and
   a space vector modulation based logic control circuit for commanding a plurality of output circuits that are set in a plurality of switches states for control of said motor, wherein said space vector modulation based logic control circuit commands said switches to generate patterns of said switch states according to said target current command signal, said position signals, and a feedback current signal generated at said current detection resistor so that each of a plurality of periods obtained by dividing a time period corresponding to said patterns of said switch states includes a first period in which a voltage vector as a function of said target current command signal, said position signals, and feedback current signal is to determine said switch states of said plurality of output circuits and a second period in which said voltage vector as a function of said target current command signal, and said feedback current signal is to determine said switch states of said plurality of output circuits.

2. The motor driver, as recited in claim 1, wherein said position detection circuit having three position detection networks, each comprises:
   a differential amplifier receiving outputs of a Hall sensor for obtaining a differential output of said Hall sensor outputs;
   a level shift circuit for shifting a voltage level of said differential output; and
   a comparator for outputting a position signal.

3. The motor driver, as recited in claim 2, wherein said position detection circuit further comprises at least one auto gain control circuit to adjust said outputs of said differential amplifiers to have the same peak value.

4. The motor driver, as recited in claim 2, wherein said current command generation circuit comprises:
   a phase shift table receiving said predetermined phase angle for determining a first gain value and a second gain value;
   a first current command generation network, comprising:
   a first multiplier receiving a first differential output of said Hall sensor outputs and said first gain value for generating a first signal; and
   a second multiplier receiving a first differential output of said Hall sensor outputs and said second gain value for generating a second signal;
   a second current command generation network, comprising:
   a third multiplier receiving a second differential output of said Hall sensor outputs and said first gain value for generating a third signal; and
   a fourth multiplier receiving a second differential output of said Hall sensor outputs and said second gain value for generating a fourth signal;
   a third current command generation network, comprising:
   a fifth multiplier receiving a third differential output of said Hall sensor outputs and said first gain value for generating a fifth signal; and
   a sixth multiplier receiving a third differential output of said Hall sensor outputs and said second gain value for generating a sixth signal;
   a first adder receiving said fifth signal and said second signal for generating a first phase angle signal;
   a second adder receiving said first signal and said fourth signal for generating a second phase angle signal;
   a third adder receiving said third signal and said sixth signal for generating a third phase angle signal;
   a seven multiplier receiving a torque command signal and said first phase angle signal for generating a first target current command signal;
   a eighth multiplier receiving said torque command signal and said second phase angle signal for generating a second target current command signal; and
   a ninth multiplier receiving said torque command signal and said third phase angle signal for generating a third target current command signal.

5. The motor driver, as recited in claim 4, wherein said current command generation circuit further comprises a torque amplitude scaling gain control circuit for adjusting a value of said torque command signal.

6. A controller for commanding a plurality of output circuits each having an upper side switch and a lower side switch connected in series for supplying a current to a motor from a connection point between said upper side switch and said lower side switch of each output circuit, comprising:

a current detection resistor connected in series with said plurality of output circuits in common for detecting a current supplied to said plurality of output circuits;

a position detection circuit for outputting position signals corresponding to a position of a rotor of said motor;

a current command generation circuit for generating target current command signals based on said position signals and a predetermined phase angle in which a phase angle of said target current command signal is determined by said predetermined phase angle; and a space vector modulation based logic control circuit for commanding a plurality of output circuits that are set in a plurality of switches states for control of said motor, wherein said space vector modulation based logic control circuit commands said switches to generate patterns of said switch states according to said target current command signal, said position signals, and a feedback current signal generated at said current detection resistor so that each of a plurality of periods obtained by dividing a time period corresponding to said patterns of said switch states includes a first period in which a voltage vector as a function of said target current command signal, said position signals, and said feedback current signal is to determine said switch states of said plurality of output circuits and a second period in which said voltage vector as a function of said target current command signal, and said feedback current signal is to determine said switch states of said plurality of output circuits.

7. The controller, as recited in claim 6, wherein said position detection circuit having three position detection networks, each comprises:

a differential amplifier receiving outputs of a Hall sensor for obtaining a differential output of said Hall sensor outputs;

a level shift circuit for shifting a voltage level of said differential output; and a comparator for outputting a position signal.

8. The motor driver, as recited in claim 7, wherein said position detection circuit further comprises at least one auto gain control circuit to adjust said outputs of said differential amplifiers to have the same peak value.

9. The controller, as recited in claim 7, wherein said current command generation circuit comprises:

a phase shift table receiving said predetermined phase angle for determining a first gain value and a second gain value;

a first current command generation network, comprising:

a first multiplier receiving a first differential output of said Hall sensor outputs and said first gain value for generating a first signal; and a second multiplier receiving a first differential output of said Hall sensor outputs and said second gain value for generating a second signal;

a second current command generation network, comprising:

a third multiplier receiving a second differential output of said Hall sensor outputs and said first gain value for generating a third signal; and a fourth multiplier receiving a second differential output of said Hall sensor outputs and said second gain value for generating a fourth signal;

a third current command generation network, comprising:

a fifth multiplier receiving a third differential output of said Hall sensor outputs and said first gain value for generating a fifth signal;

a sixth multiplier receiving a third differential output of said Hall sensor outputs and said second gain value for generating a sixth signal;

a first adder receiving said fifth signal and said second signal for generating a first phase angle signal;

a second adder receiving said first signal and said fourth signal for generating a second phase angle signal;

a third adder receiving said third signal and said sixth signal for generating a third phase angle signal;

a seven multiplier receiving a torque command signal and said first phase angle signal for generating a first target current command signal;

a eighth multiplier receiving said torque command signal and said second phase angle signal for generating a second target current command signal; and a ninth multiplier receiving said torque command signal and said third phase angle signal for generating a third target current command signal.

10. The controller, as recited in claim 9, wherein said current command generation circuit further comprises a torque amplitude scaling gain control circuit for adjusting a value of said torque command signal.

11. A method for controlling an electric motor with an inverter that has a plurality of switches which can be commanded to a plurality of switch states, and a current detection resistor connected in series with said inverter, comprising the steps of:

detecting a current supplied to said plurality of switches;

outputting position signals corresponding to a position of a rotor of said motor;

generating target current command signals based on said position signals and a predetermined phase angle in which a phase angle of said target current command signal is determined by said predetermined phase angle; and commanding a plurality of switches that are set in a plurality of switches states for control of said electric motor, wherein said space vector modulation based logic control circuit commands said switches to generate patterns of said switch states according to said target current command signal, said position signals, and a feedback current signal generated at said current detection resistor so that each of a plurality of periods obtained by dividing a time period corresponding to said patterns of said switch states includes a first period in which a voltage vector as a function of said target current command signal, said position signals, and said feedback current signal is to determine said switch states of said plurality of output circuits and a second period in which said voltage vector as a function of said target current command signal, and said feedback current signal is to determine said switch states of said plurality of output circuits.

* * * * *